(12) United States Patent
Hampel

(10) Patent No.: US 12,284,979 B2
(45) Date of Patent: Apr. 29, 2025

(54) CALF PAIRING UNIT

(71) Applicant: L.T. HAMPEL CORP., Germantown, WI (US)

(72) Inventor: Lance T. Hampel, Germantown, WI (US)

(73) Assignee: L.T. HAMPEL CORP., Germantown, WI (US)

( * ) Notice: Subject to any disclaimer, the term of this patent is extended or adjusted under 35 U.S.C. 154(b) by 52 days.

(21) Appl. No.: 18/032,729

(22) PCT Filed: Oct. 29, 2021

(86) PCT No.: PCT/US2021/057390
§ 371 (c)(1),
(2) Date: Apr. 19, 2023

(87) PCT Pub. No.: WO2022/094302
PCT Pub. Date: May 5, 2022

(65) Prior Publication Data
US 2023/0389511 A1 Dec. 7, 2023

Related U.S. Application Data

(60) Provisional application No. 63/107,231, filed on Oct. 29, 2020.

(51) Int. Cl.
*A01K 1/00* (2006.01)
(52) U.S. Cl.
CPC .................................. *A01K 1/0088* (2013.01)
(58) Field of Classification Search
CPC ..... E04H 17/18; E04H 17/185; A01K 1/0088; A01K 1/0035; A01K 3/001; A01K 1/0011; A01K 1/0005

(Continued)

(56) References Cited

U.S. PATENT DOCUMENTS

| 948,351 A | * | 2/1910 | Smith | ..................... A01K 3/001 256/25 |
| 2,678,629 A | | 5/1954 | Meyer | |

(Continued)

FOREIGN PATENT DOCUMENTS

| DE | 20212906 U1 | 8/2003 | |
| EP | 2803262 A2 * | 11/2014 | ........... A01K 1/0088 |
| FR | 2736376 A1 * | 1/1997 | .............. E01F 1/005 |

OTHER PUBLICATIONS

International Search Report and Written Opinion for Application No. PCT/US2021/057390 dated Jan. 28, 2022 (12 pages).

(Continued)

*Primary Examiner* — Brady W Frazier
*Assistant Examiner* — Zoe Tam Tran
(74) *Attorney, Agent, or Firm* — Michael Best &* Friedrich LLP

(57) ABSTRACT

A housing system for a calf including a housing unit having a first exterior sidewall, a second exterior sidewall, a front exterior wall extending between the first exterior sidewall and the second exterior sidewall, a roof extending between the first exterior sidewall and the second exterior sidewall, an opening at least partially defined by the front exterior wall for ingress and egress of a calf into and out of the housing unit, and an enclosed living space extending between and bounded by the first and second exterior sidewalls and the front exterior wall.

11 Claims, 24 Drawing Sheets

(58) Field of Classification Search
USPC .......................................................... 119/472
See application file for complete search history.

(56) References Cited

U.S. PATENT DOCUMENTS

| | | | | |
|---|---|---|---|---|
| 3,726,256 | A | | 4/1973 | Bernhardt et al. |
| 4,193,377 | A | * | 3/1980 | Weldy .................. A01K 1/0005 256/26 |
| 4,462,335 | A | * | 7/1984 | Ahrens ................ A01K 1/0218 119/448 |
| 5,218,925 | A | * | 6/1993 | Anderson ............ A01K 1/0088 119/501 |
| 6,691,644 | B1 | | 2/2004 | Anderson |
| 11,846,114 | B1 | * | 12/2023 | Studebaker, Jr. ....... E04H 17/18 |
| 2003/0146426 | A1 | * | 8/2003 | Ray ...................... A01K 1/0035 256/59 |
| 2003/0209208 | A1 | * | 11/2003 | Campbell ................. B60P 3/04 119/513 |
| 2005/0241593 | A1 | * | 11/2005 | Kaura .................. A01K 1/0088 119/496 |
| 2011/0120384 | A1 | | 5/2011 | Wilson |
| 2015/0334987 | A1 | * | 11/2015 | Schwartz ............... A01K 3/001 119/514 |
| 2018/0359989 | A1 | * | 12/2018 | Hampel ................... A01K 1/02 |
| 2020/0315123 | A1 | * | 10/2020 | Deges .................... F16M 13/02 |

OTHER PUBLICATIONS

Partial Supplementary European Search Report for Application No. 21887652.2 dated Sep. 6, 2024 (22 pages).

* cited by examiner

CALF PAIRING UNIT

CROSS-REFERENCE TO RELATED APPLICATIONS

This is a U.S. national stage entry of International Patent Application No. PCT/US2021/057390, filed on Oct. 29, 2021, which claims priority to U.S. Provisional Patent Application No. 63/107,231, filed on Oct. 29, 2020, the entire contents of each of which are fully incorporated herein by reference.

FIELD OF INVENTION

The present invention relates to housing units for animals.

BACKGROUND

Farm animals often live in housing units that provide shelter and a space for the animal to move around. For example, calves may live in individual housing units with shelters (e.g., hutches) and with fences surrounding a yard in front of the hutch. The calves may roam between the hutch and the yard. Often times the calves are separated into individual units such that only a single calf lives within each housing unit and they are isolated from one another. For example, there may be a row of multiple housing units, which each include a single hutch for housing a one calf. This housing arrangement prevents calves from engaging with or socializing with other calves.

SUMMARY

In one construction the present disclosure provides a housing system for calves including first and second housing units each having a first exterior sidewall, a second exterior sidewall, a front exterior wall extending between the first exterior sidewall and the second exterior sidewall, and a roof extending between the first exterior sidewall and the second exterior sidewall. An opening is at least partially defined by the front exterior wall for ingress and egress of a calf into and out of the housing unit, and an enclosed living space extends between and bounded by the first and second exterior sidewalls and the front exterior wall. The first and second housing units are positioned with respect to each other so that the first exterior sidewall of the first housing unit is positioned adjacent and in facing relationship with respect to the second exterior sidewall of the second housing unit. A perimeter fence at least partially defines a yard open to the openings of the first and second housing units but closed to the egress of calves from the yard. A divider fence is movable between a stowed position between the first exterior wall of the first housing unit and the second exterior wall of the second housing unit, and a deployed position in which the divider fence separates the yard into first and second portions each open to a respective opening of the first and second housing units, but closed to movement of calves between the first and second portions of the yard.

In another construction the present disclosure provides a housing system for a calf, the housing system including a housing unit having a first exterior sidewall, a second exterior sidewall, a front exterior wall extending between the first exterior sidewall and the second exterior sidewall, a roof extending between the first exterior sidewall and the second exterior sidewall, an opening at least partially defined by the front exterior wall for ingress and egress of a calf into and out of the housing unit, and an enclosed living space extending between and bounded by the first and second exterior sidewalls and the front exterior wall. A perimeter fence at least partially defines a yard open to the opening of the housing unit but closed to the egress of a calf from the yard. An auxiliary fence is hinged to either or both the housing unit and the perimeter fence for rotating between a first position overlapping a part of the perimeter fence, and a second position in which the auxiliary fence closes the opening of the housing unit.

In yet another construction the present disclosure provides a housing system for calves including first and second housing units each having a first exterior sidewall, a second exterior sidewall, a front exterior wall extending between the first exterior sidewall and the second exterior sidewall, a roof extending between the first exterior sidewall and the second exterior sidewall, an opening at least partially defined by the front exterior wall for ingress and egress of a calf into and out of the housing unit, and an enclosed living space extending between and bounded by the first and second exterior sidewalls and the front exterior wall. A perimeter fence at least partially defines a yard open to the openings of the first and second housing units but closed to the egress of calves from the yard. An axle is coupled to the first housing unit; wherein the first and second housing units are connected together by either or both the perimeter fence and the axle. The first housing unit is rotatable about the axle between an operational configuration in which a calf can enter and exit the yard through the opening of the first housing unit, and a transport configuration in which at least a portion of the first housing unit is stowed inside the perimeter fence. The second housing unit is rotatable between an operational configuration in which a calf can enter and exit the yard through the opening of the second housing unit, and a transport configuration in which at least a portion of the second housing unit is stowed inside the perimeter fence.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Farm animals often live in housing units that provide shelter and a space for the animal to move around. For example, calves may live in individual housing units with shelters (e.g., hutches) and with fences surrounding a yard in front of the hutch. The calves may roam between the hutch and the yard. Often times the calves are separated into individual units such that only a single calf lives within each housing unit and they are isolated from one another. For example, there may be a row of multiple housing units, which each include a single hutch for housing one calf. This housing arrangement prevents calves from engaging with or socializing with other calves. At times it may be beneficial for calves to be able to interact with and socialize with other calves. Accordingly, disclosed herein is a calf pairing unit or a group housing unit, which allows calves the opportunity to interact with one another while also enabling farmers to separate the calves when needed. For example, calves may generally be allowed to interact with a housing mate, but may be separated for feeding, medical examination, illness, or other reasons. It should be understood that although the present disclosure is described with respect to calves, similar group housing units may be used for other animals.

Figure 1:
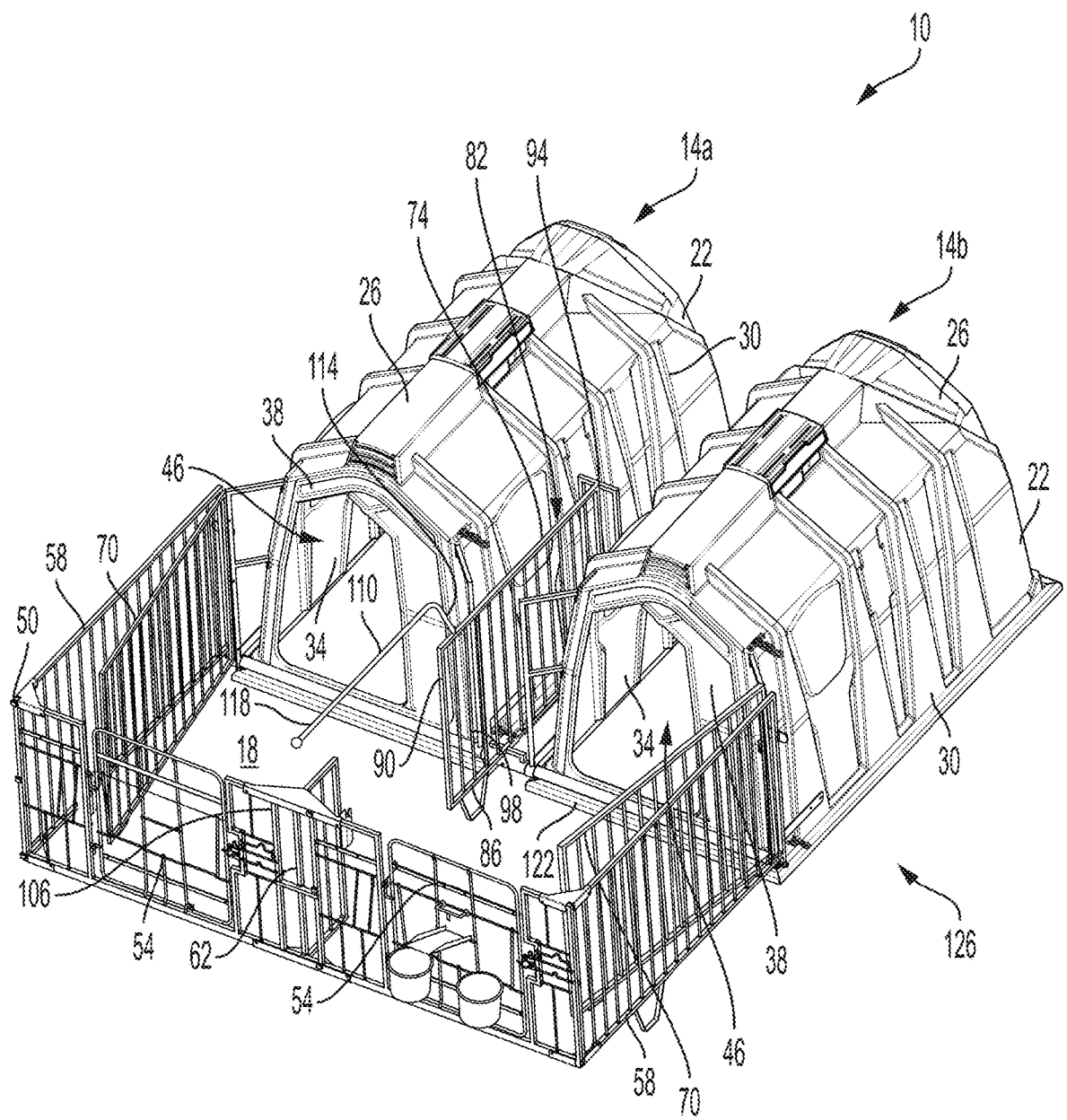
FIG. 1 is a perspective view of a housing system according to one embodiment with a divider fence in a first position.
Figure 2:
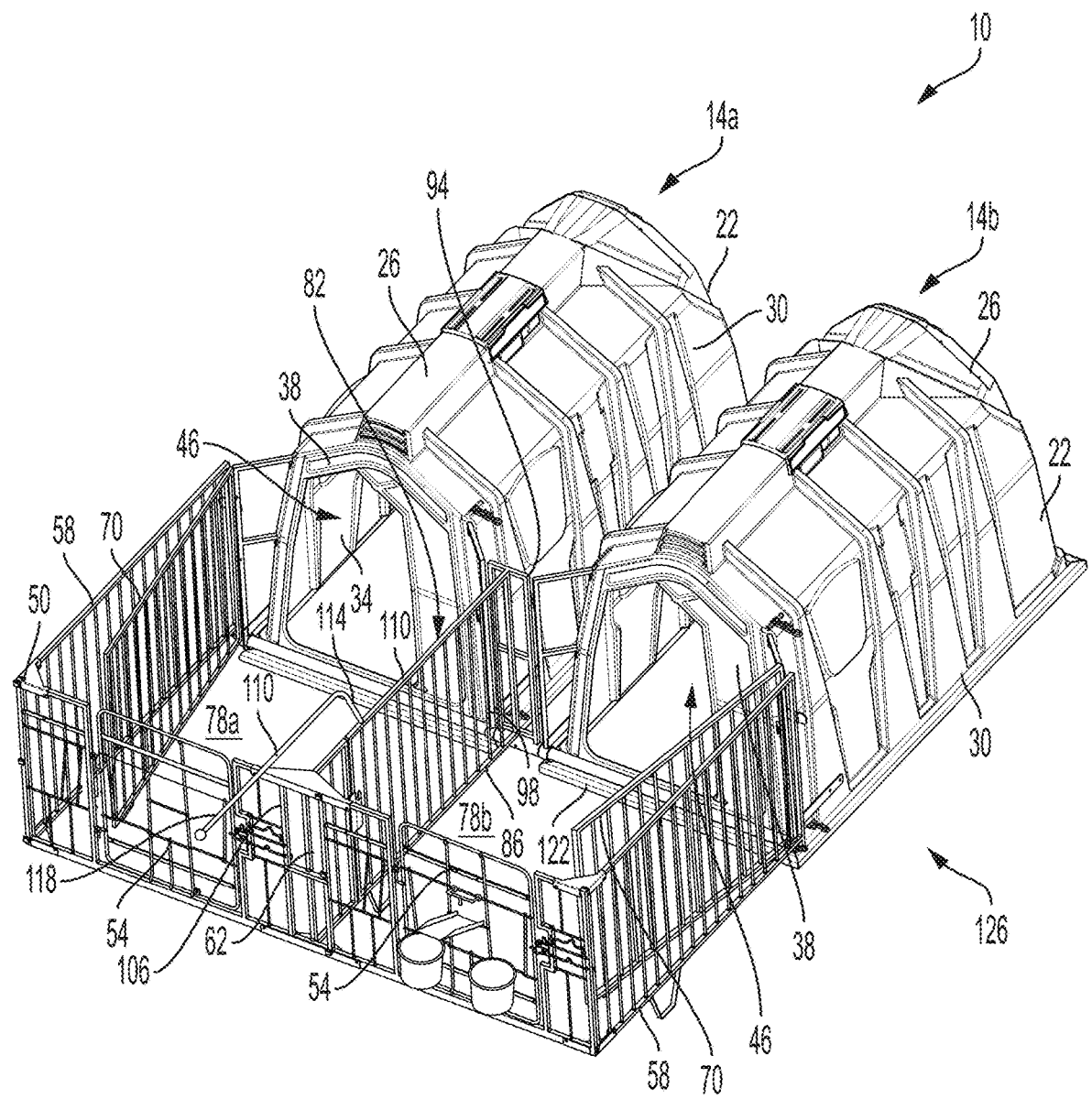
FIG. 2 is a perspective view of the housing system of FIG. 1 with the divider fence in a second position.
Figure 3:
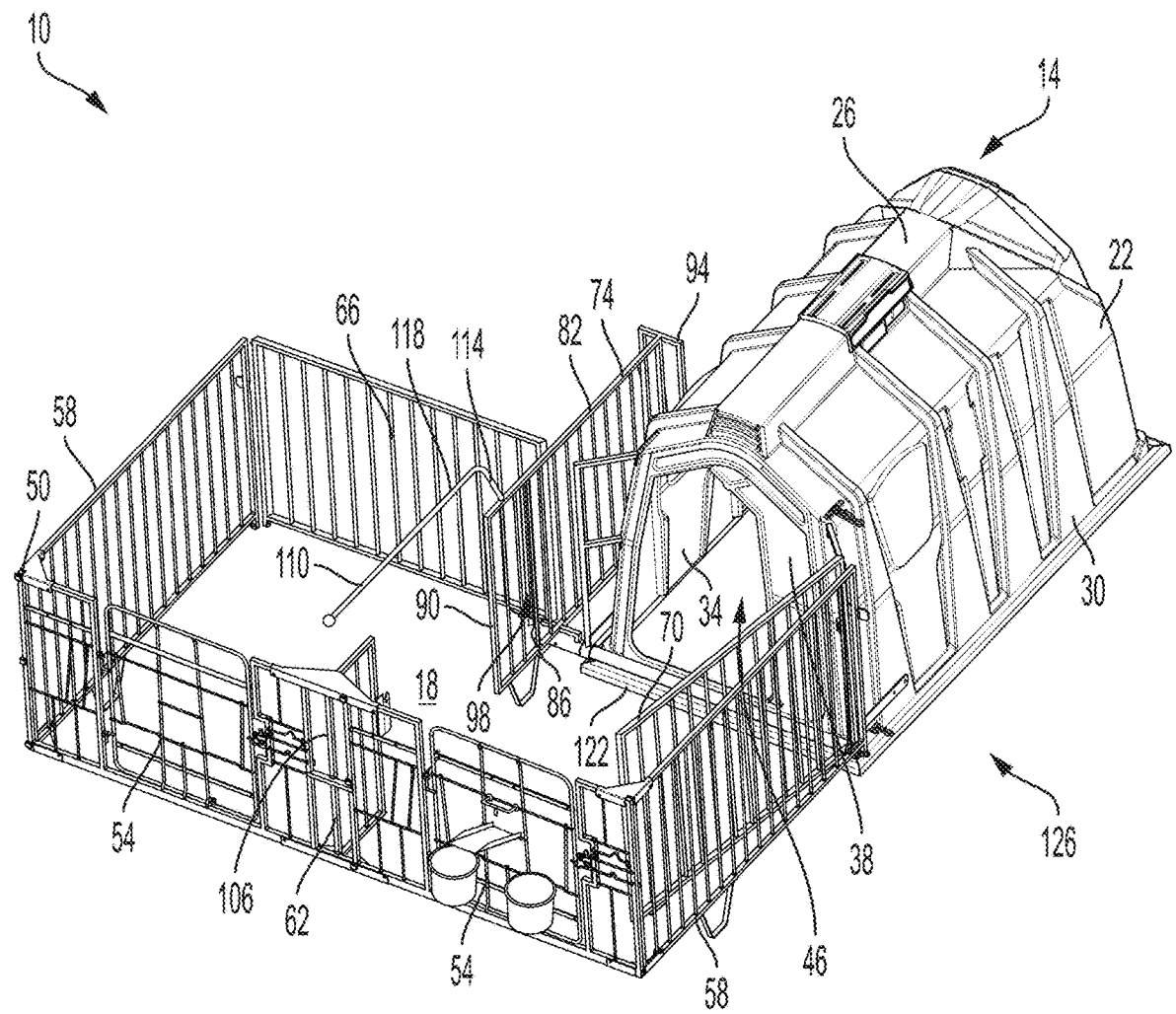
FIG. 3 is a perspective view of a housing system according to another embodiment.

FIGS. 1-3 illustrate various embodiments of an animal housing system. In the embodiment shown in FIG. 1, the animal housing system includes a plurality of housing units, such as a hutch, and a shared yard that is accessible to each of the plurality of housing units. For example, the housing unit may include a first housing unit and a second housing unit, and a yard extending across the first housing unit and the second housing unit. The first housing unit and the second housing unit each provide shelter for an animal, such as a calf. The yard provides a place for the animals to roam around outdoors.

FIGS. 1-3 illustrate various embodiments of an animal housing system 10. In the embodiment shown in FIG. 1, the animal housing system 10 includes a plurality of housing units 14, such as a hutch, and a shared yard 18 that is accessible to each of the plurality of housing units 14. For example, the housing unit 14 may include a first housing unit 14a and a second housing unit 14b, and a yard 18 extending across the first housing unit 14a and the second housing unit 14b. The first housing unit 14a and the second housing unit 14b each provide shelter for an animal, such as a calf. The yard 18 provides a place for the animals to roam around doors 54.

FIG. 3 illustrates an alternate embodiment of an animal housing system 10 with like numerals corresponding to like parts. The animal housing system 10 shown in FIG. 3 includes a single hutch and a yard 18 for allowing the animals to roam. In this embodiment, the housing unit 14 may provide shelter for a single animal, or may house multiple animals depending on the situation.

With continued reference to FIGS. 1-3, each housing unit 14 includes an exterior wall 22 defining a perimeter of the housing unit 14 and a roof 26 extending over the top of the exterior wall 22. The exterior wall 22 may be defined by a plurality of faces, including a first exterior sidewall 30, a second exterior sidewall 34, a front exterior sidewall 38, and a rear exterior sidewall 42. The roof 26 may extend over the top of the exterior wall 22 from the front exterior sidewall 38 to the rear exterior sidewall 42 and from the first exterior sidewall 30 to the second exterior sidewall 34. Although some embodiments may have a different configuration. Furthermore, in some embodiments, the exterior wall 22 and the roof 26 are formed as a unitary body. For example, the housing unit 14 may be manufactured by injection molding, thermoforming, or other process that allow the housing unit 14 to be formed as a single unitary body.

The front exterior sidewall 38 defines an opening 46 that allows for ingress and egress of the animal into and out of the housing unit 14. The opening 46 allows the animal to move freely between the housing unit 14 and the yard 18. In the illustrated embodiment, the first housing unit 14a and the second housing unit 14b are arranged side by side with the openings 46 of each housing unit 14 facing the same direction. More specifically, the first housing unit 14a and the second housing unit 14b are positioned with respect to each other so that the front exterior sidewalls 38 are arranged generally on the same plane, and the rear exterior sidewalls 42 are arranged generally on the same plane. Additionally, the first exterior sidewall 30 of the first housing unit 14a is positioned adjacent and in facing relationship with respect to the second exterior sidewall 34 of the second housing unit 14b. However, in other embodiments, the housing units 14 may be arranged differently. For example, rather than a side by side arrangement, the housing units 14 may be arranged in a linear arrangement with the openings 46 facing each other. Alternatively, the housing units 14 may be arranged at an angle relative to one another, such as a 90 degree angle of the opening 46 relative to one another.

Figure 4:
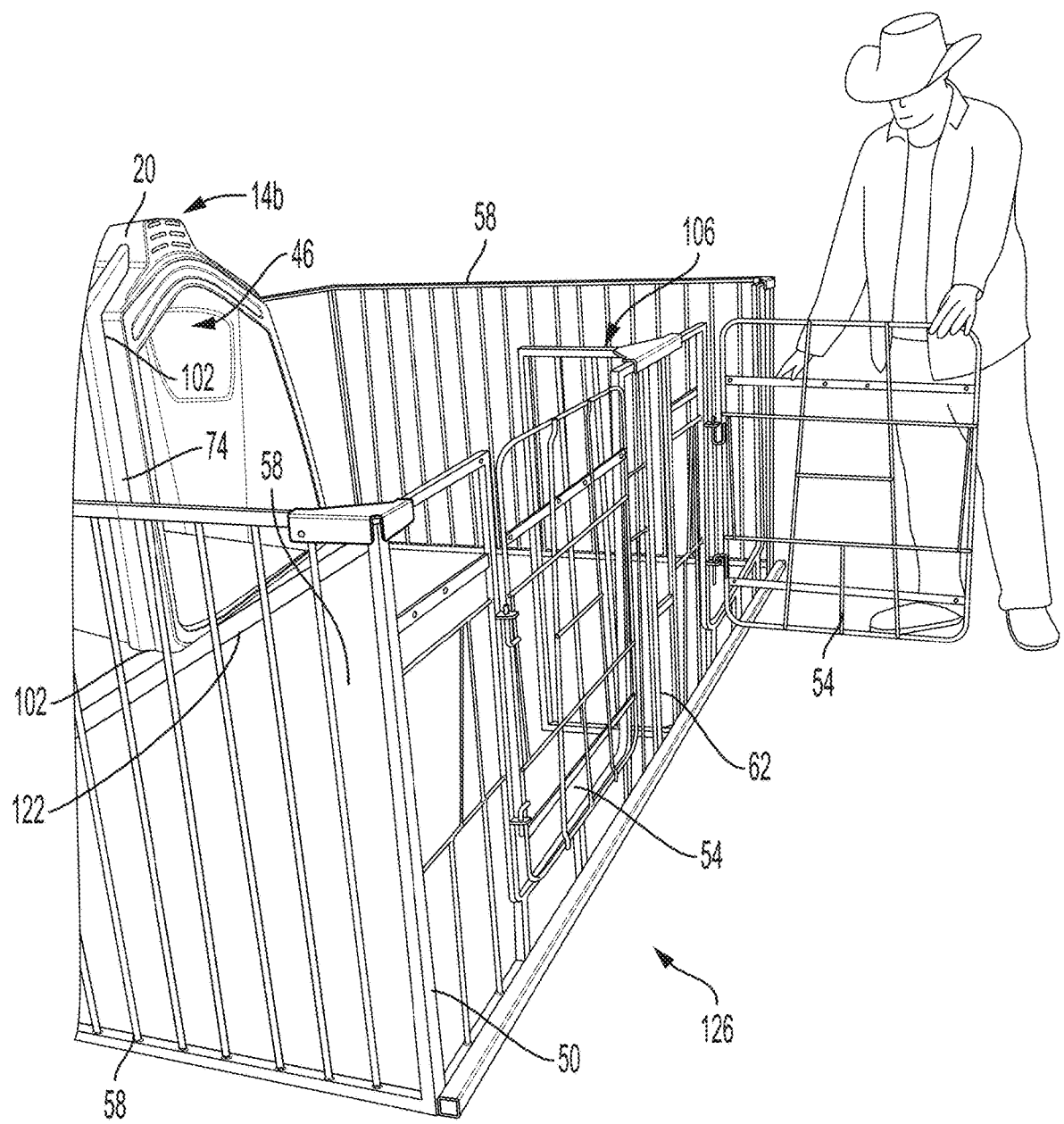
FIG. 4 illustrates a perimeter fence of the housing system.

Referring to FIGS. 1-3, the animal housing system 10 further includes a perimeter fence 50 at least partially defining the yard 18. The yard 18 is accessible to the animals via the openings 46 of the housing units 14 but is generally closed to the egress of animals from the yard 18. However, the perimeter fence 50 may include one or more door 54 selectively providing access to the yard 18. As shown in FIG. 4, this enables a person to enter the yard 18 to assist the animals, provide food, clean, etc. In the illustrated embodiment shown in FIGS. 1-2, the perimeter fence 50 includes two doors 54, one positioned in front of and facing each of the openings 46 in the housing units 14. More specifically, the perimeter fence 50 includes two side panels 58 extending forwardly from the housing units 14 and two front panels 62 extending between the side panels 58. In the illustrated embodiment, a door 54 is disposed on each of the front panels 62. However, the perimeter fence 50 may include a greater or fewer number of panels or doors 54. For example, as shown in FIG. 3, the perimeter fence 50 may further include one or more rear panels 66 along the back side of the yard 18. Additionally, the panels and doors 54 may be arranged differently or positioned at different locations along the perimeter fence 50.

In addition to the perimeter fence 50, the housing system 10 may further include one or more auxiliary fence 70, as shown in FIGS. 1-3. The auxiliary fence 70 selectively closes the opening 46 of the housing to limit egress of the calf from the housing unit 14. In the illustrated embodiment, the auxiliary fence 70 is hinged to either or both of the housing unit 14 and the perimeter fence 50. Accordingly the auxiliary fence 70 may pivot or swing between a first position overlapping a part of the perimeter fence 50, and a second position in which the auxiliary fence 70 closes opening 46 of the housing unit 14.

With continued reference to FIGS. 1-3, the housing system 10 further includes a divider fence 74 capable of separating the yard 18 into portions 78. Specifically, the housing system 10 includes a divider fence 74 that may selectively separate the yard 18 into a first portion 78a and a second portion 78b. As shown in the embodiment illustrated in FIGS. 1-2, the first portion 78a and the second portion 78b are each open to a respective opening 46 of the first housing unit 14a and second housing unit 14b. However, the divider fence 74 may prevent movement of the animals between the first portion 78a and the second portion 78b of the yard 18. In the illustrated embodiment, the housing system 10 includes two housing units 14 and one divider fence 74 that divides the yard 18 into a first portion 78a and a second portion 78b, one for each housing unit 14. However, in other embodiments, there may be a greater or fewer number of divider fence 74s and/or housing units 14. For example, the housing system 10 may include three housing units 14 that share a yard 18, and two divider fences 74 capable of separating the yard 18 into three portions 78, one portion 78 for each housing unit 14. Similarly, as shown in FIG. 3, the housing system 10 may include a single housing unit 14 and a divider fence 74 that selectively separate the yard 18 into a first portion 78a and a second portion 78b. As will be understood, other arrangements of housing units 14 and divider fences 74 may be used.

In the illustrated embodiment, the divider fence 74 includes a top edge 82, a bottom edge 86, a front edge 90, and a rear edge 94, which defined the perimeter of the divider fence 74. The front edge 90 and the rear edge 94 each extend between the top edge 82 and the bottom edge 86 and define a height of the divider fence 74. The top edge 82 and the bottom edge 86 each extend between the front edge 90 and the rear edge 94 and define a length of the divider fence 74. In some embodiments, the length of the divider fence 74 is less than a length of the housing unit 14. The divider fence 74 includes a face 98 extending between the top edge 82, the bottom edge 86, the front edge 90 and the rear edge 94. The face 98 defines a plane that is able to separate the yard 18 into the first portion 78a and the second portion 78b.

The divider fence 74 is movable between a stowed position (FIGS. 1 and 3) and a deployed position (FIG. 2). When in the stowed position, the divider fence 74 is retracted from the yard 18 and positioned alongside the housing unit 14. For example, in the embodiment shown in FIGS. 1-2, when in the stowed position, the divider fence 74 is positioned between the first exterior wall 22 of the first housing unit 14a and the second exterior wall 22 of the second housing unit 14b. When the divider fence 74 is in the stowed position, the animals may move freely within the yard 18 (i.e., between the first portion 78a and the second portion 78b).

When in the deployed position, the divider fence 74 separates the yard 18 into the first portion 78a and the second portion 78b. In the embodiment illustrated in FIGS. 1 and 3, the first portion 78a and the second portion 78b are each accessible to a single housing unit 14. Specifically, the opening 46 of the first housing unit 14a is open to the first portion 78a of the yard 18 and the opening 46 of the second housing unit 14b is open to the second portion 78b of the yard 18. However, the first portion 78a and the second portion 78b are closed to movement of the animals between the first portion 78a and second portion 78b of the yard 18. Additionally, when the divider fence 74 is in the deployed position, the first portion 78a and second portion 78b of the yard 18 are each defined by one of the side panels 58, one of the front panels 62, and the divider fence 74. Similarly, in the embodiment shown in FIG. 2, when the divider fence 74 is in the deployed position, the first portion 78a of the yard 18 is accessible to the housing unit 14 while the second portion 78b is closed to movement of the animal(s) between the first portion 78a and second portion 78b of the yard 18. Additionally, in the illustrated embodiments, each portion 78 of the yard 18 may be accessed by a corresponding door 54 on the perimeter fence 50. For example, the first portion 78a may be accessed by a first door 54a on the front panel 62 of the perimeter fence 50, and the second portion 78b may be accessed by a second door 54 on the front panel 62 of the perimeter fence 50.

Figure 5:
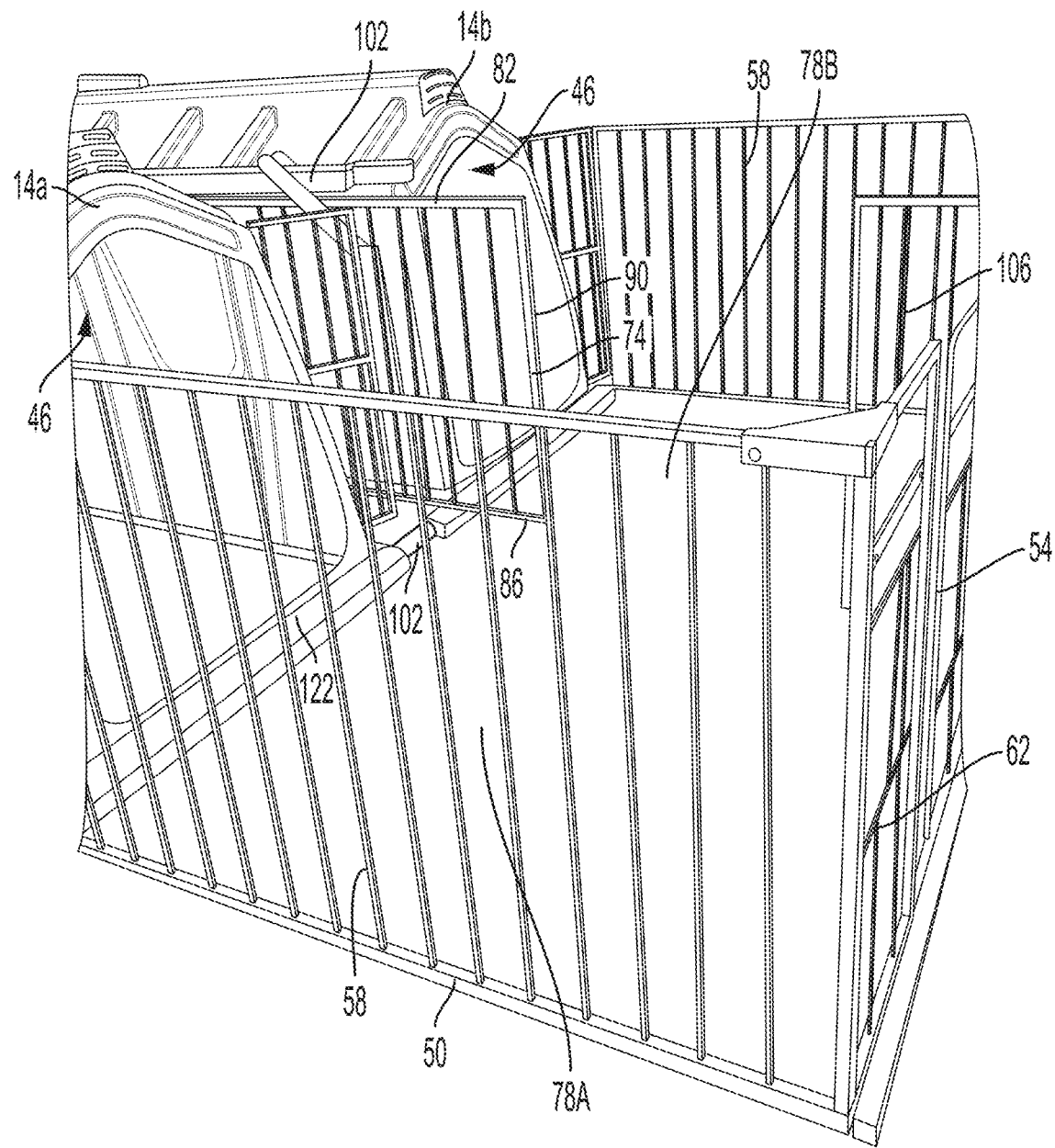
FIG. 5 illustrates a divider fence of the housing system in a first position.
Figure 6:
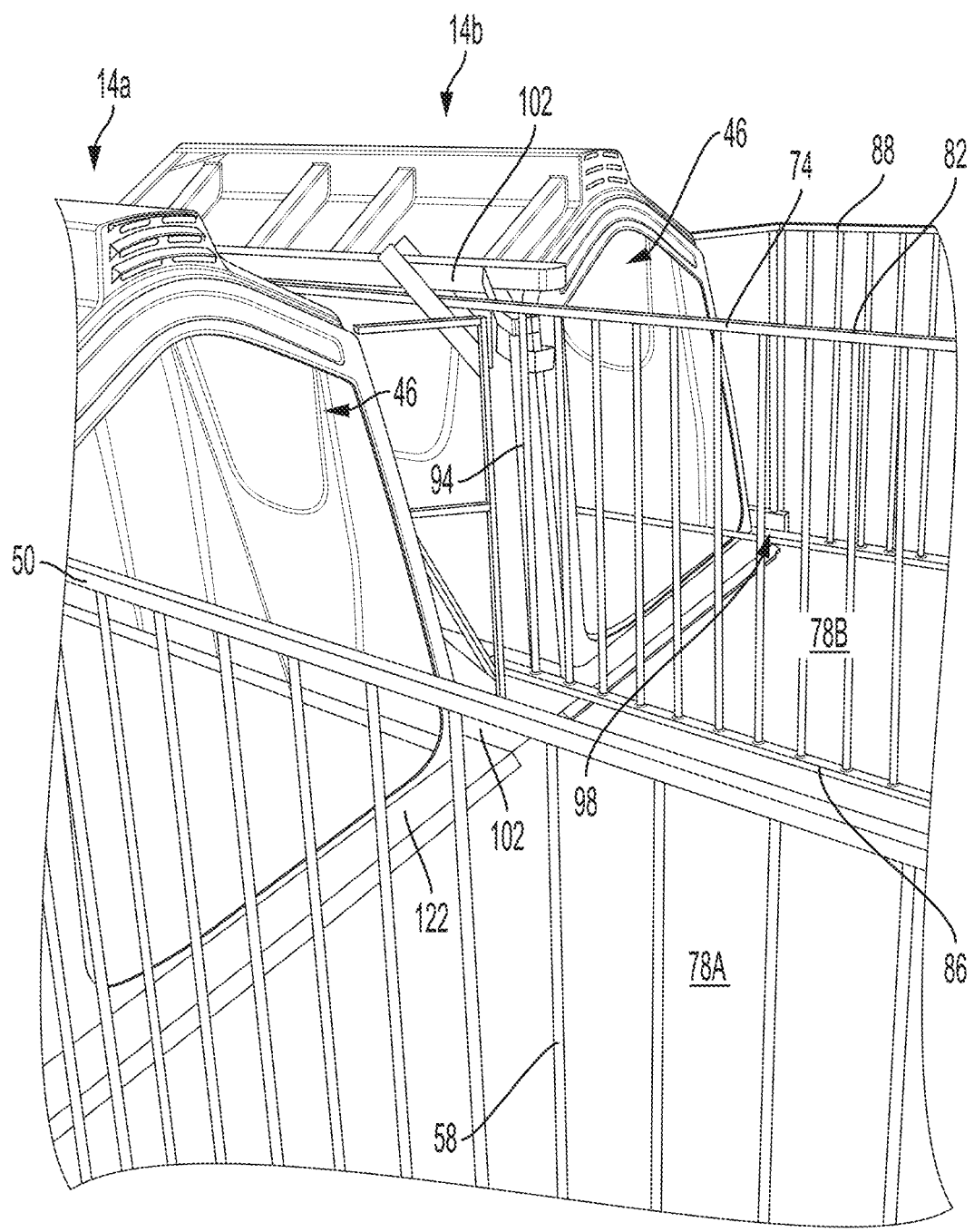
FIG. 6 illustrates the divider fence of FIG. 5 of the housing system in a second position.

In the illustrated embodiment, the divider fence 74 is movable between the stowed position and the deployed position by sliding back and forth along the plane defined by the face 98 of the divider fence 74 (i.e., along the direction of the length of the divider fence 74). For example, the divider fence 74 may slide along a track 102 (shown in FIGS. 5-6) positioned between the first housing unit 14a and the second housing unit 14b. The track 102 may extend along the entire distance between the rear ends of the housing units 14 all the way to the front panels 62 of the perimeter fence 50, or may extend only partially along this distance. In the illustrated embodiment, the track 102 extends between the housing units 14 but does not extend into the yard 18. In the illustrated embodiment, the bottom edge 86 of the divider fence 74 slides along the track 102. However, in other embodiments, the top edge 82 of the divider fence 74 may engage with the track 102. In other embodiments, the divider fence 74 may be slidable along other mechanisms such as wheels, rollers, a channel, or other sliding mechanisms.

Figure 8:
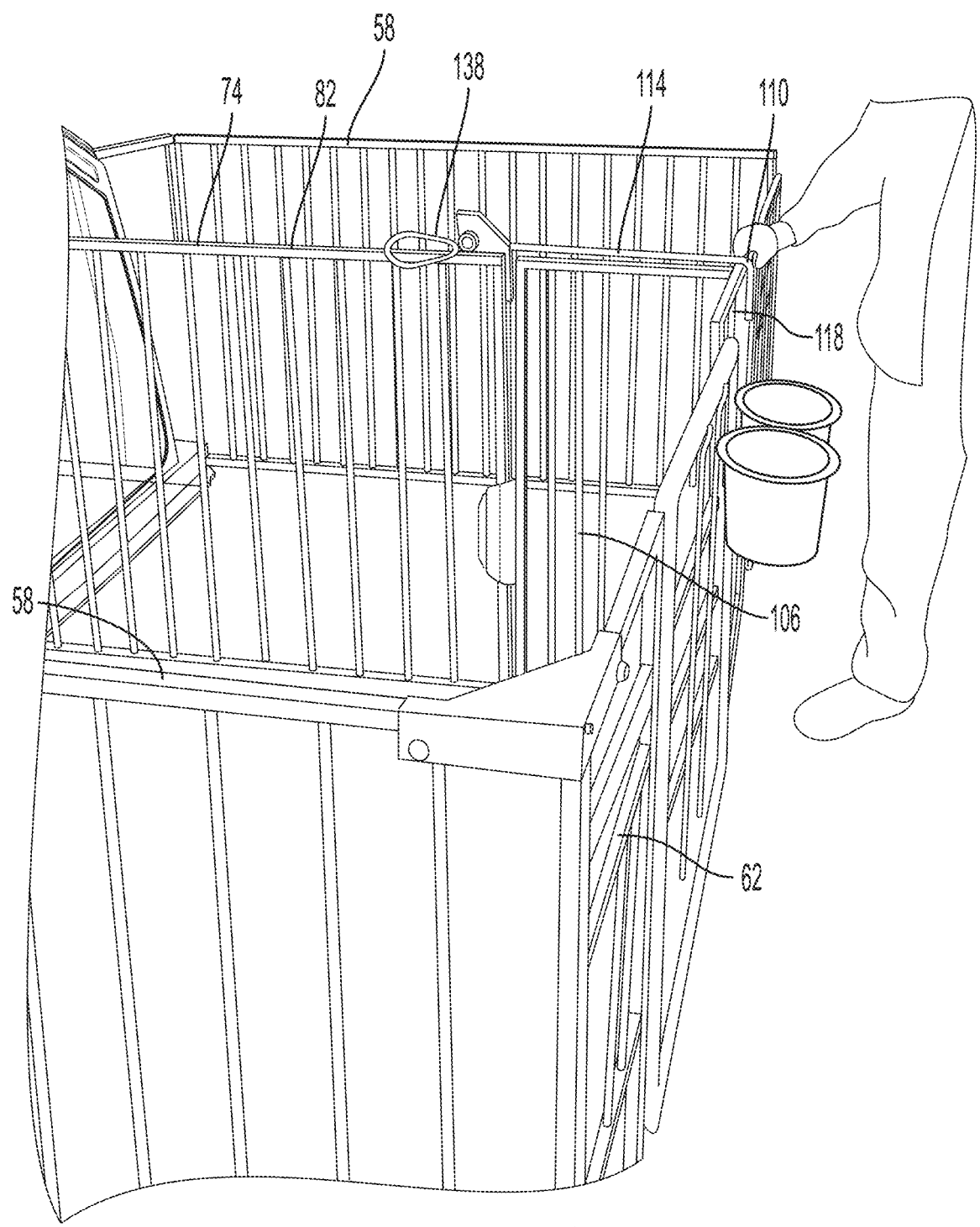
FIG. 8 illustrates the handle of FIG. 7 in a closed position.

Additionally, in some embodiments, the perimeter fence 50 further includes a receiving portion 106 that is connectable to the divider fence 74 when the divider fence 74 is in the deployed position. The receiving portion 106 may be a section of the perimeter fence 50 that connects to or otherwise latches to the divider fence 74 to help maintain the divider fence 74 in the fully deployed position. In some embodiments, the receiving portion 106 may be a section of the perimeter fence 50 that extends partially into the yard 18 to meet the divider fence 74. For example, the receiving portion 106 illustrated in FIG. 8 is a section of the perimeter fence 50 that extends into the yard 18 and aligns with the front edge 90 of the divider fence 74. In other embodiments, the receiving portion 106 may be a latch or coupling member that releasable connects the divider fence 74 to the perimeter fence 50.

Referring to FIGS. 1-2, the divider fence 74 includes a handle 110 that assists in moving the divider fence 74 between the stowed position and the deployed position. In the illustrated embodiment, the handle 110 is configured to enable a user to move the divider fence 74 between the stowed position and the deployed position without having to enter the yard 18. In the illustrated embodiment, the handle 110 is coupled to the top edge 82 of the divider fence 74 and is accessible to a user who is standing outside the perimeter fence 50 (i.e., outside the yard 18). However, in other embodiments, the handle 110 may be arranged in other configurations that enable a user to move the divider fence 74 without entering the yard 18. For example, in some embodiments, the handle 110 may be coupled to a front edge 90 or the face of the divider fence 74.

Figure 7:
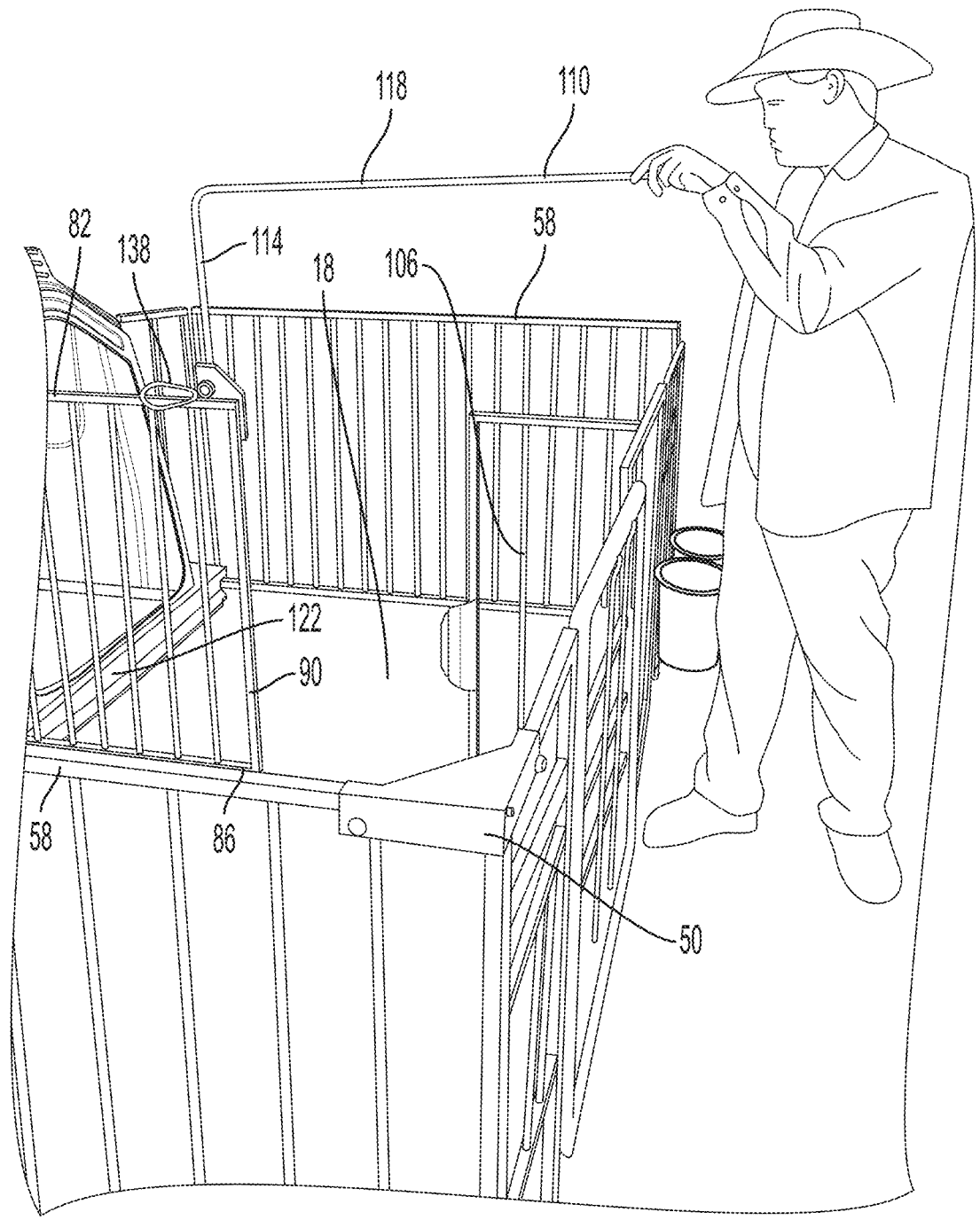
FIG. 7 illustrates a handle of the housing system in a working position.
Figure 9:
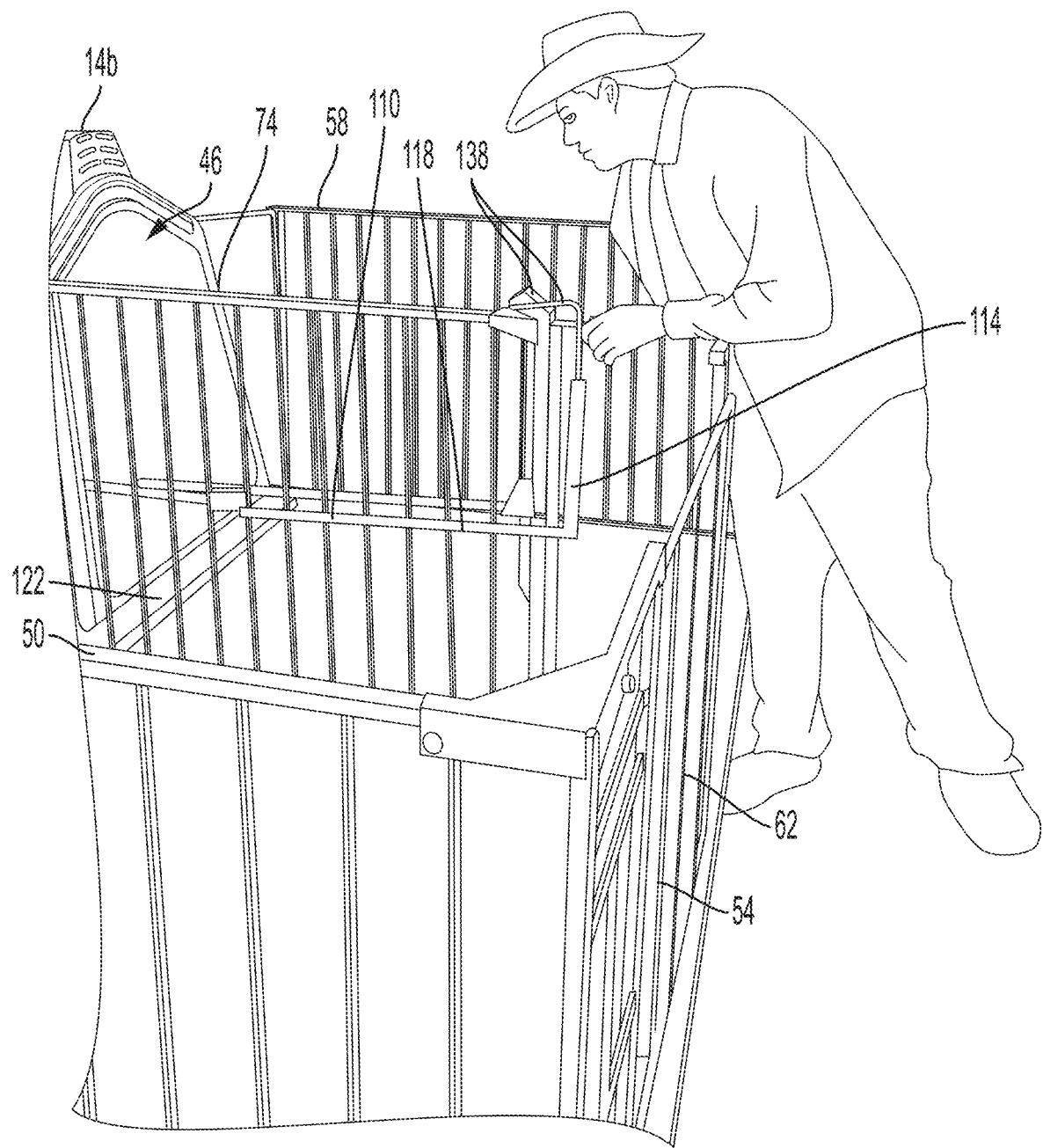
FIG. 9 illustrates the handle of FIG. 7 in a transport position.
Figure 10:
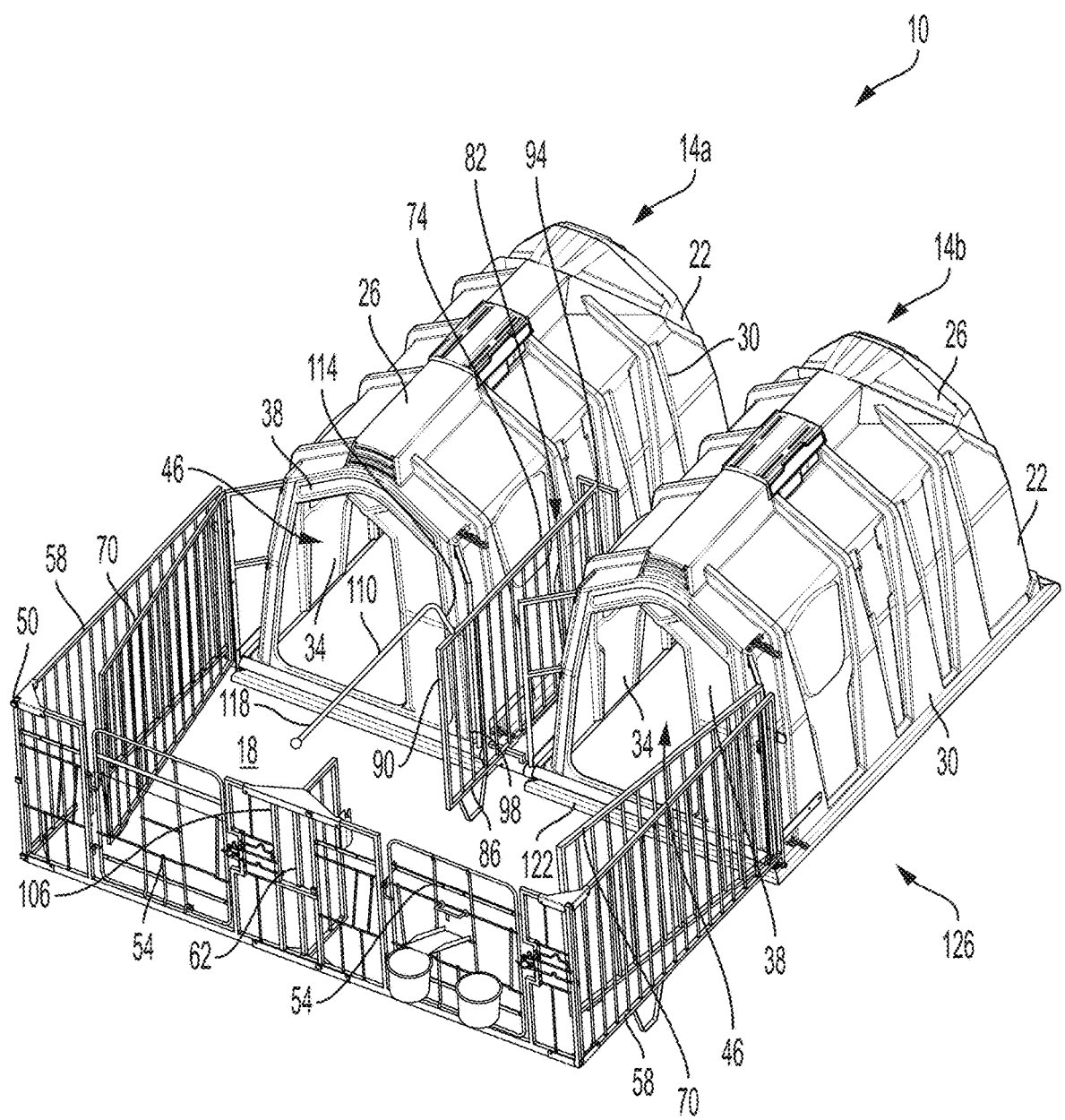
FIG. 10 illustrates the housing system in an operational configuration.

Referring to FIGS. 7-9, the handle 110 is adjustable between three different positions, including a working position (FIG. 8), a closed position (FIG. 9), and a transport position (FIG. 10). In particular, the illustrated handle 110 is movable between these three positions by rotating about a pin defining an axis. Additionally, the handle 110 may be locked in any of these positions by a locking mechanism 138. It should be understood that in some embodiments, the handle 110 may not be movable between different positions or may only be movable between some of these positions.

When in the working position, the handle 110 is operable to move the divider fence 74 between the stowed position and the deployed position. As shown in FIGS. 1, 2, and 7, when in the working position, the handle 110 extends upwardly from the top edge 82 of the divider fence 74 and outwardly towards the perimeter fence 50 to allow a user to reach the handle 110 while standing outside of the perimeter fence 50. In particular, the illustrated handle 110 includes a first shaft 114 extending upwardly from the divider fence 74 (i.e., in the direction of the front edge 90), and a second shaft 118 extending outwardly from the divider fence 74 and toward the perimeter fence 50 (i.e., in the direction of the top edge 82). When in the working position, a distal end of the handle 110 is accessible to a user while the user is standout outside of the yard 18 and the perimeter fence 50. In other embodiments, the handle 110 may have other shapes or configurations that enable a user to reach the handle 110 while standing outside of the perimeter fence 50. For example, in some embodiments, the handle 110 may be arcuate. In other embodiments, the handle 110 may be formed as a rope or pulley system.

As shown in FIG. 8, the handle 110 can be rotated to the closed position, in which the handle 110 locks or maintains the divider fence 74 in the fully deployed position (i.e., a closed position that prevents ingress and egress of the animals between the first portion 78a and second portion 78b of the yard 18). Referring to FIG. 8, when in the closed position, the handle 110 is oriented with the first shaft 114 extending along the top edge 82 of the divider fence 74 and the second shaft 118 extending downwardly from the top edge 82 of the divider fence 74 in the direction of the front edge 90). The second shaft 118 extends along an exterior side of the perimeter fence 50 to lock or maintain the divider fence 74 in the deployed position. In other embodiments, the handle 110 may not extend along the exterior of the perimeter fence 50, but may maintain the divider fence 74 in the closed position by simply engaging with the receiving portion 106 of the perimeter fence 50. Furthermore, in other embodiments, the handle 110 may not include a closed position, but rather, the divider fence 74 may be maintained in the closed position via another locking mechanism.

Finally, referring to FIG. 9, the handle 110 may be rotated to a transport position in which the handle 110 is moved out of the way to a tucked position. In the illustrated embodiment, the handle 110 extends along the face of the divider fence 74 so that it is not extending beyond the perimeter of the divider fence 74. The handle 110 is typically arranged in the transport position when the housing assembly is being transported.

Figure 11:
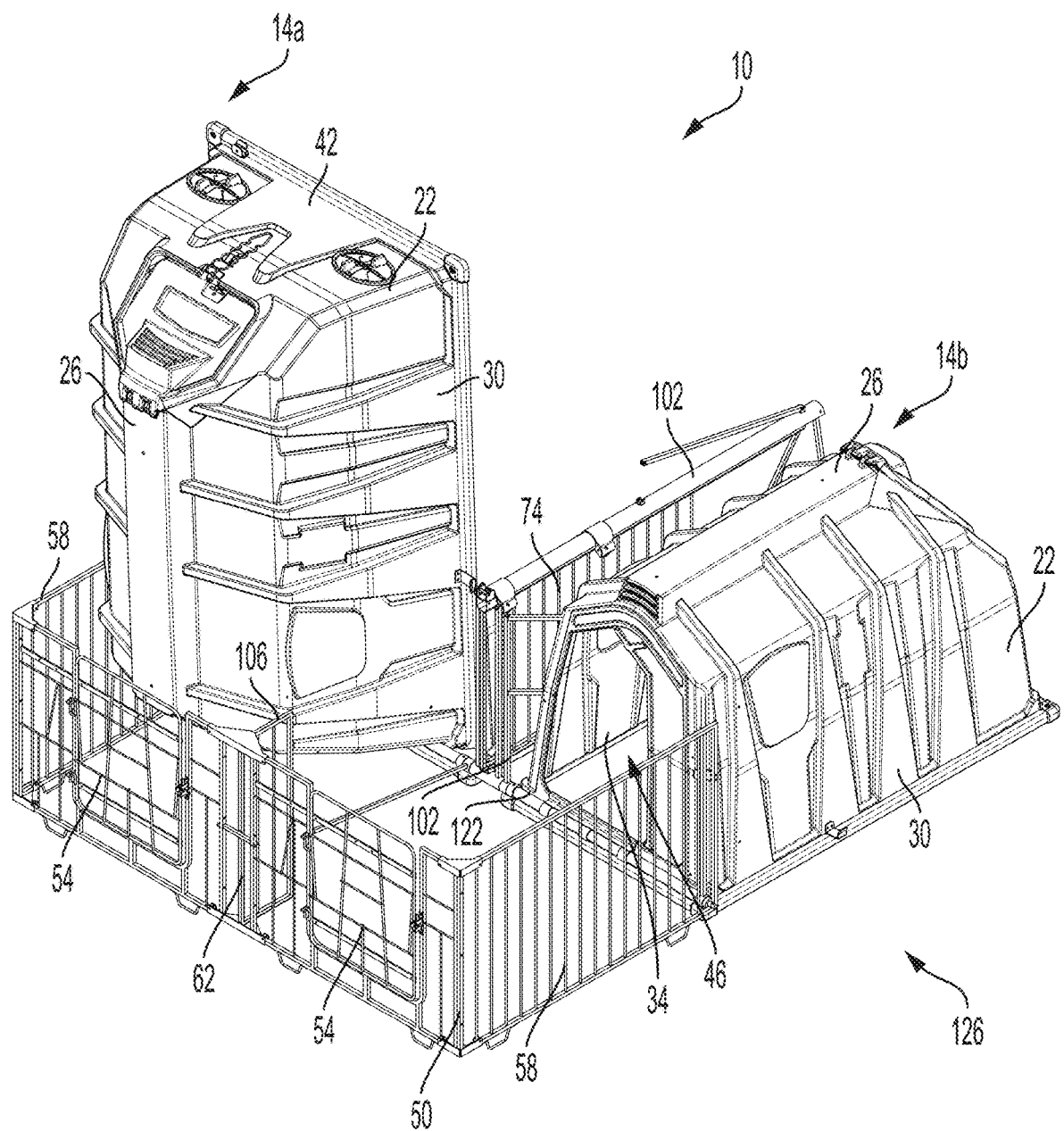
FIG. 11 illustrates the housing system with one housing unit in an operational configuration and one housing unit in a transport configuration.
Figure 12:
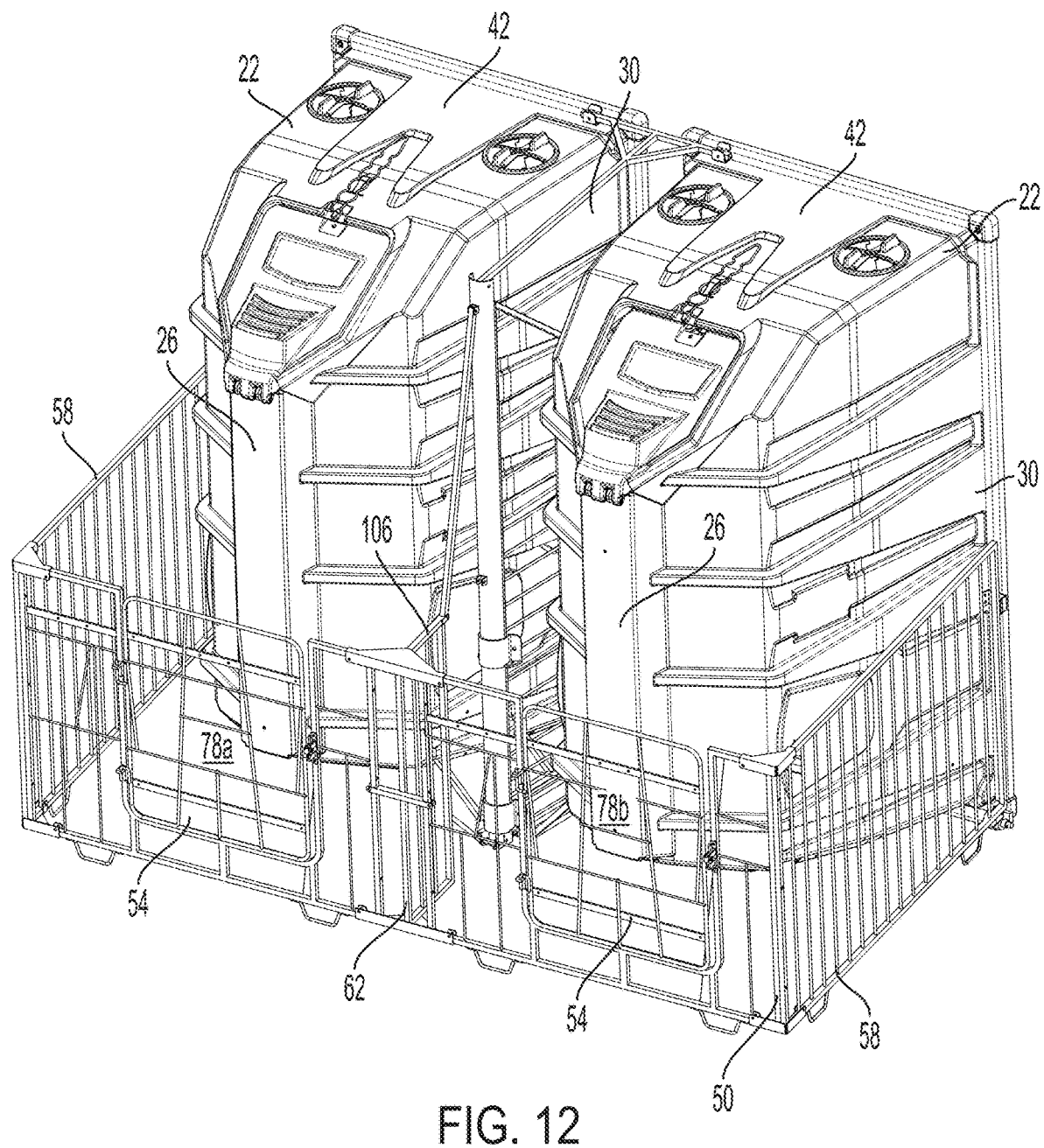
FIG. 12 illustrates the housing system in a transport configuration.

Referring to FIGS. 10-12, the housing system 10 is convertible from an operational configuration to a transport configuration in order to help transport the housing system 10. When in the transport configuration (shown in FIG. 12), the housing units 14 and the divider fence 74 are collapsible within the boundary of the perimeter fence 50 and the yard 18. One exemplary embodiment of how the housing system 10 may adjust between the operational configuration and the transport configuration is shown in FIGS. 10-12 and is described below. However, it should be understood that the following description is merely exemplary and that other embodiments and configurations are possible.

Figure 13:
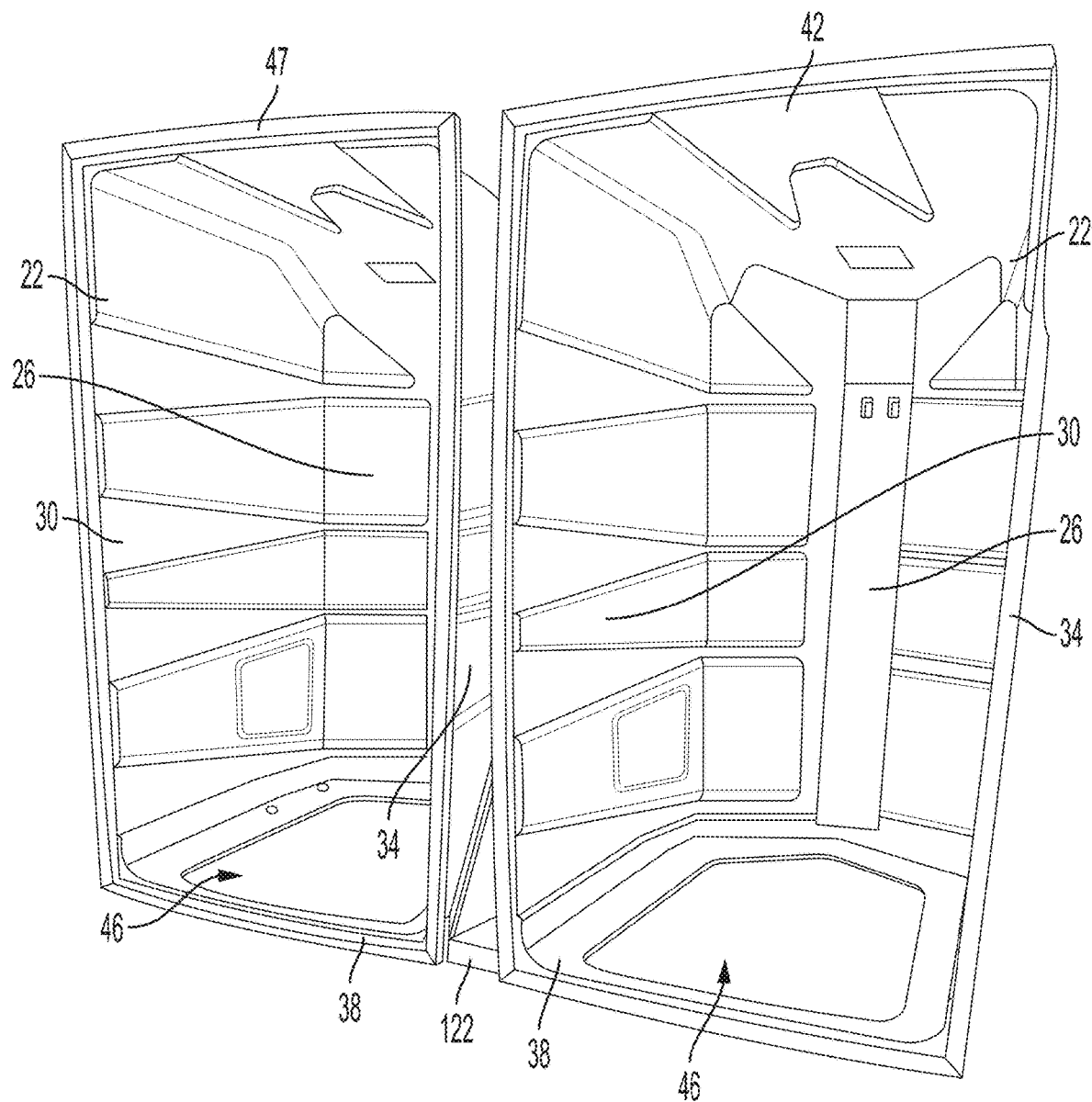
FIG. 13 is a rear view of the housing system in the transport configuration.

As shown in FIGS. 10 and 11, the housing units 14 are each coupled to an axle 122 about which the housing units 14 may rotate. The axle 122 may be extends in a direction perpendicular to the plane defined by the divider fence 74. In the illustrated embodiment, the axle 122 extends along a bottom edge 86 of the front exterior wall 22 of each of the housing units 14. In some embodiments, a single axle 122 extends continuously across at least two housing units 14. In some embodiments, each housing rotates about a separate axle 122. The axle 122 allows the housing units 14 to rotated between an operational configuration and a transport configuration. When the housing unit 14 is in the operational configuration (FIG. 10), a bottom edge 86 of each face of the exterior wall 22 is supported on a ground surface 126. When the housing unit 14 is rotated to the transport configuration (FIGS. 12-13), the bottom edges 86 of the rear exterior sidewall 42, the first exterior sidewall 30, and second exterior sidewall 34 are all lifted off of (i.e., rotated away from) the ground surface 126, and the face of the front exterior sidewall 38 is oriented to face the ground surface 126. Furthermore, when the housing unit 14 is rotated to the transport configuration, the housing unit 14 is positioned without the bounds of the perimeter fence 50 and the yard 18.

Figure 14:
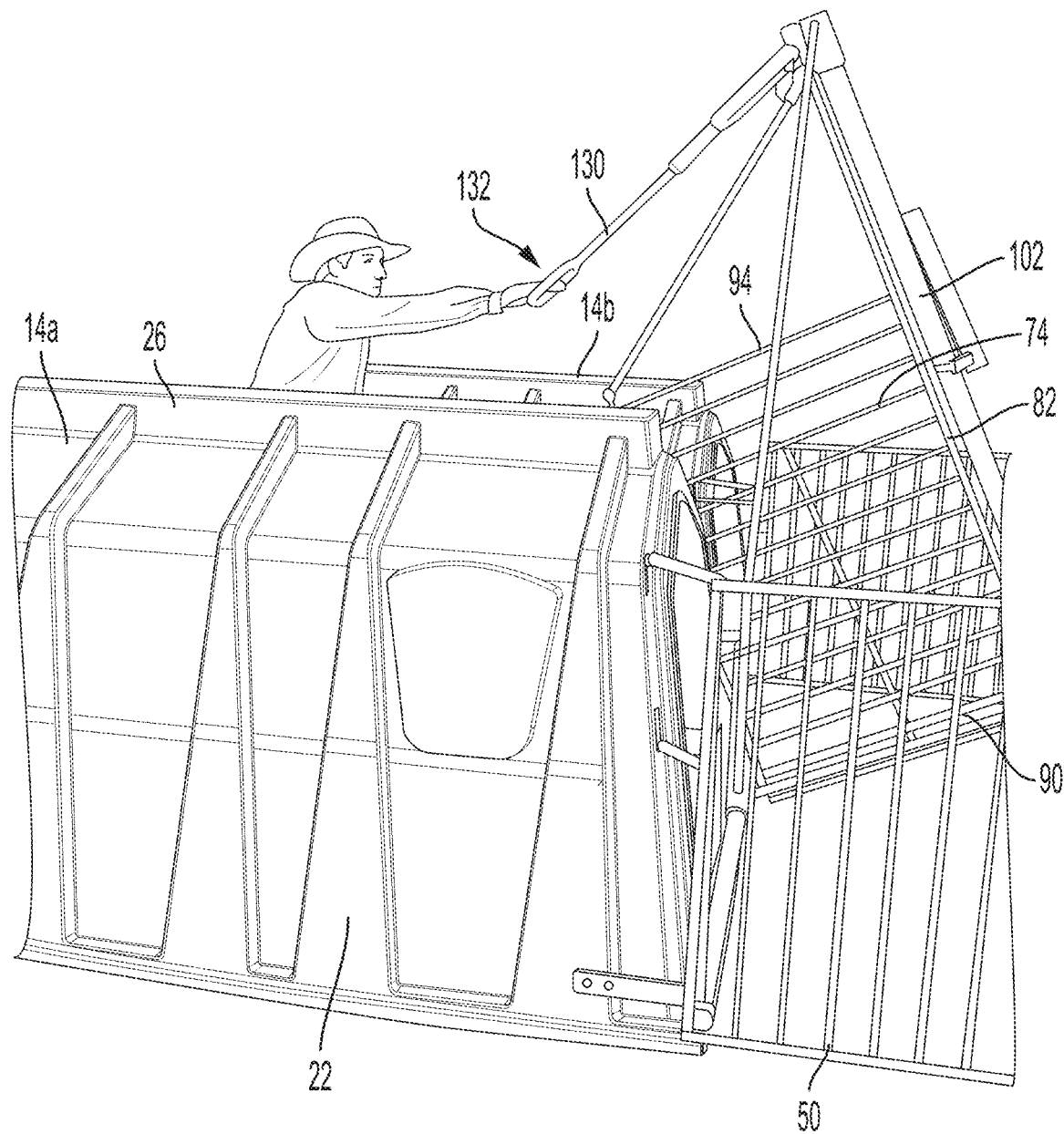
FIG. 14 illustrates the divider fence moving between a transport configuration and an operational configuration.

In addition, the divider fence 74 is also adjustable between the operational configuration and the transport configuration. As shown in FIGS. 10 and 14, the divider fence 74 may be rotatably coupled to the same axle 122 that the housing units 14 rotate about when converting between the operational configuration and the transport configuration. In another embodiment, the divider fence 74 does not rotate relative to the axle 122. Rather, the divider fence 74 and the axle 122 may rotate together relative to the housing units 14. For example, the divider fence 74 may be fixedly coupled to the axle 122 by a coupling member. Nevertheless, the divider fence 74 may still rotate about an axis defined by the axle 122.

When in the operational configuration (FIG. 10), the divider fence 74 is oriented in a horizontal configuration (i.e., the length of the fence is oriented horizontally with respect to the ground surface 126). More specifically, the bottom edge 86 of the divider fence 74 extends along the ground surface 126. When in the transport configuration (FIGS. 12 and 15), the divider fence 74 is oriented in a vertical configuration (i.e., the length of the fence is oriented vertically with respect to the ground surface 126). More specifically, the front edge 90 of the divider fence 74 extends along the ground surface 126 while the bottom edge 86 extends in a direction generally orthogonal to the ground surface 126.

Figure 15:
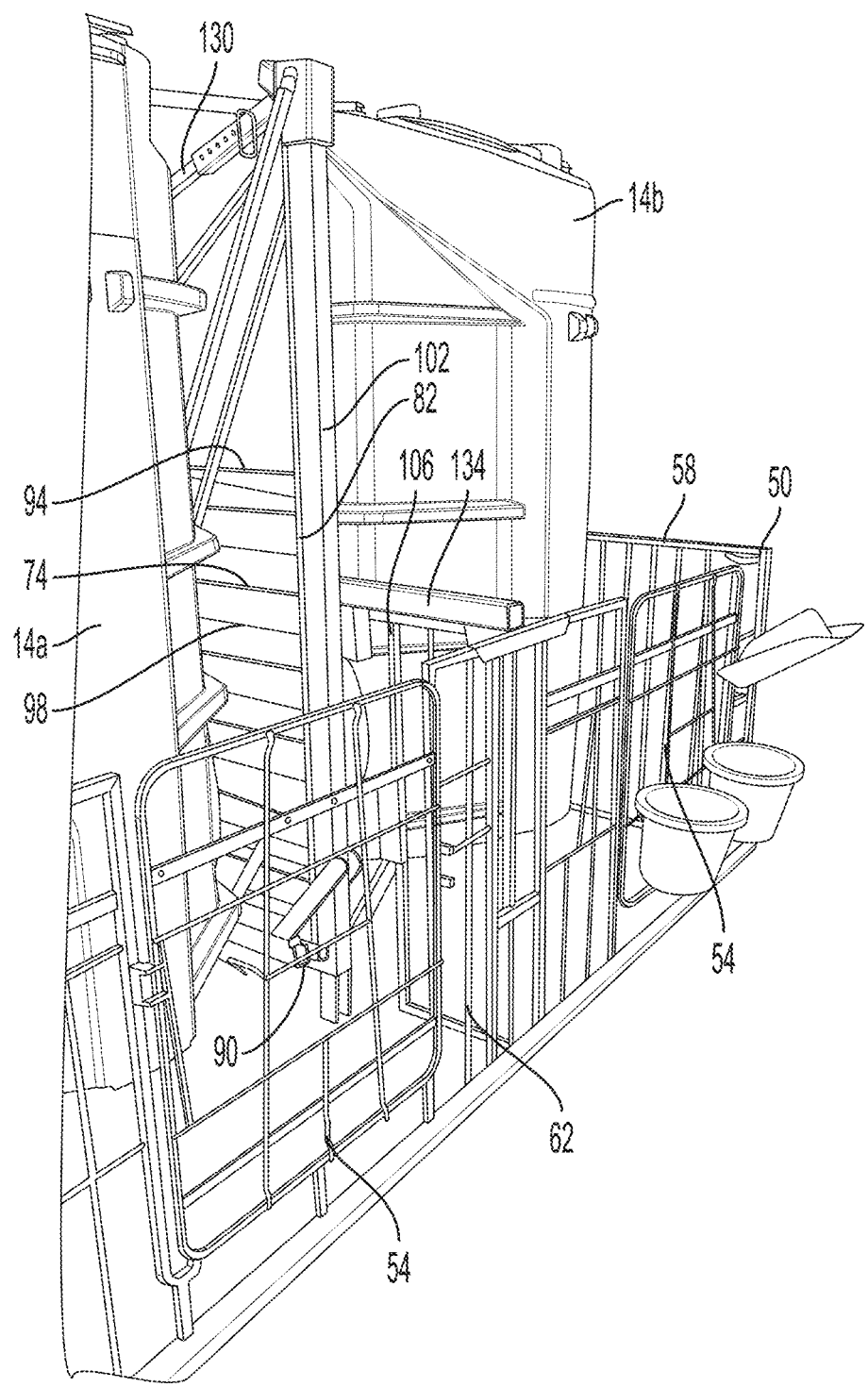
FIG. 15 illustrates the divider fence in the transport configuration.

Referring to FIG. 14, in some embodiments, the divider fence 74 includes lever 130 to help rotate the divider fence 74 between the operational configuration and the transport configuration. In the illustrated embodiment, the lever 130 extends from a rear end of the fence and includes a handgrip 132 that allows the user to grip the lever 130 to rotate the divider fence 74. The lever 130 also helps support the divider fence 74. Specifically, the handgrip 132 of the lever 130 may engage a ground surface or a bottom edge of a housing unit 14. Additionally, the divider fence 74 may also include a support structure 134, which helps secure the divider fence 74 when in the transport configuration. FIG. 15 illustrates one exemplary support structure 134. In the illustrated embodiment, the support structure 134 is an arm 134 extending from and generally perpendicular to the top edge 82 of the divider fence 74. When in the transport configuration, the arm 134 engages the receiving portion 106 of the perimeter fence 50 to support the divider fence 74 when in the vertical orientation. Additionally, in some embodiments, the arm 134 may be selectively secured (i.e., locked) to the receiving member to maintain the divider fence 74 in the transport configuration in order to avoid unintentional movement of the divider fence 74 during transport.

Figure 16:
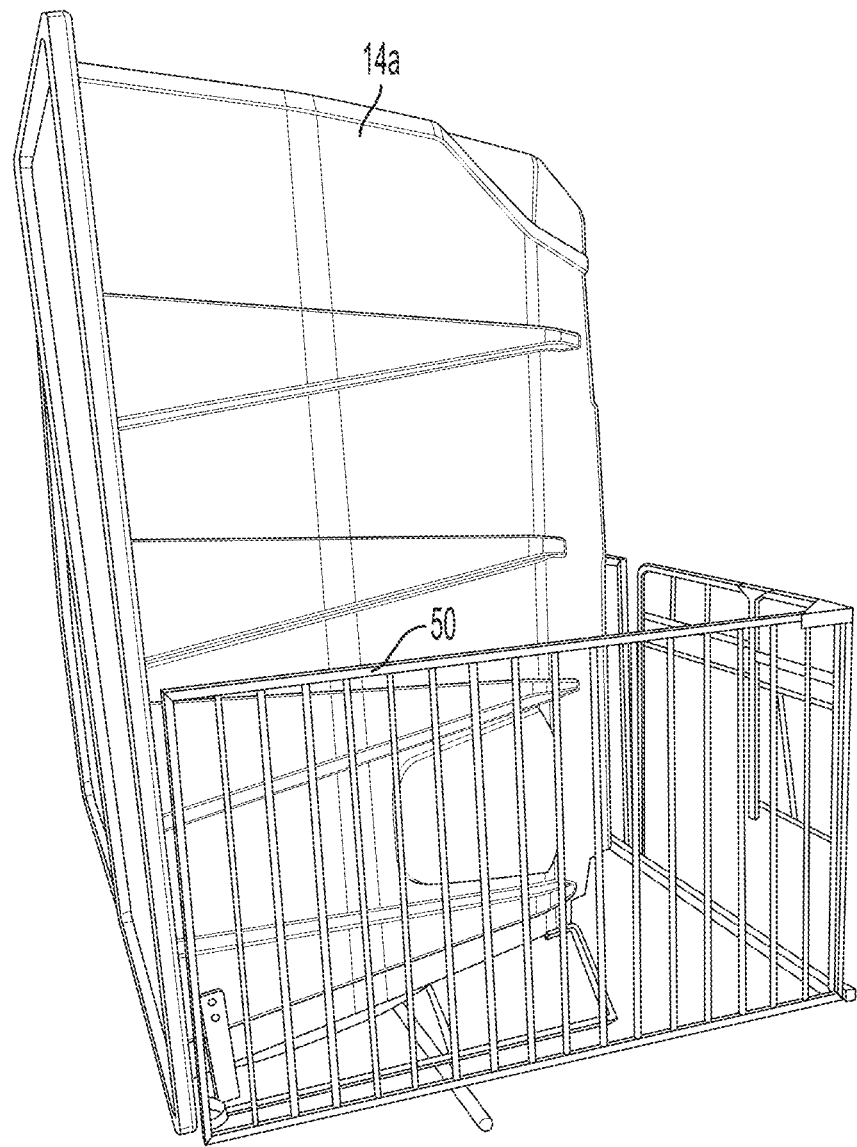
FIG. 16 illustrates the housing system in the transport configuration.
Figure 17:
FIG. 17 illustrates the housing system in the transport configuration.
Figure 18:
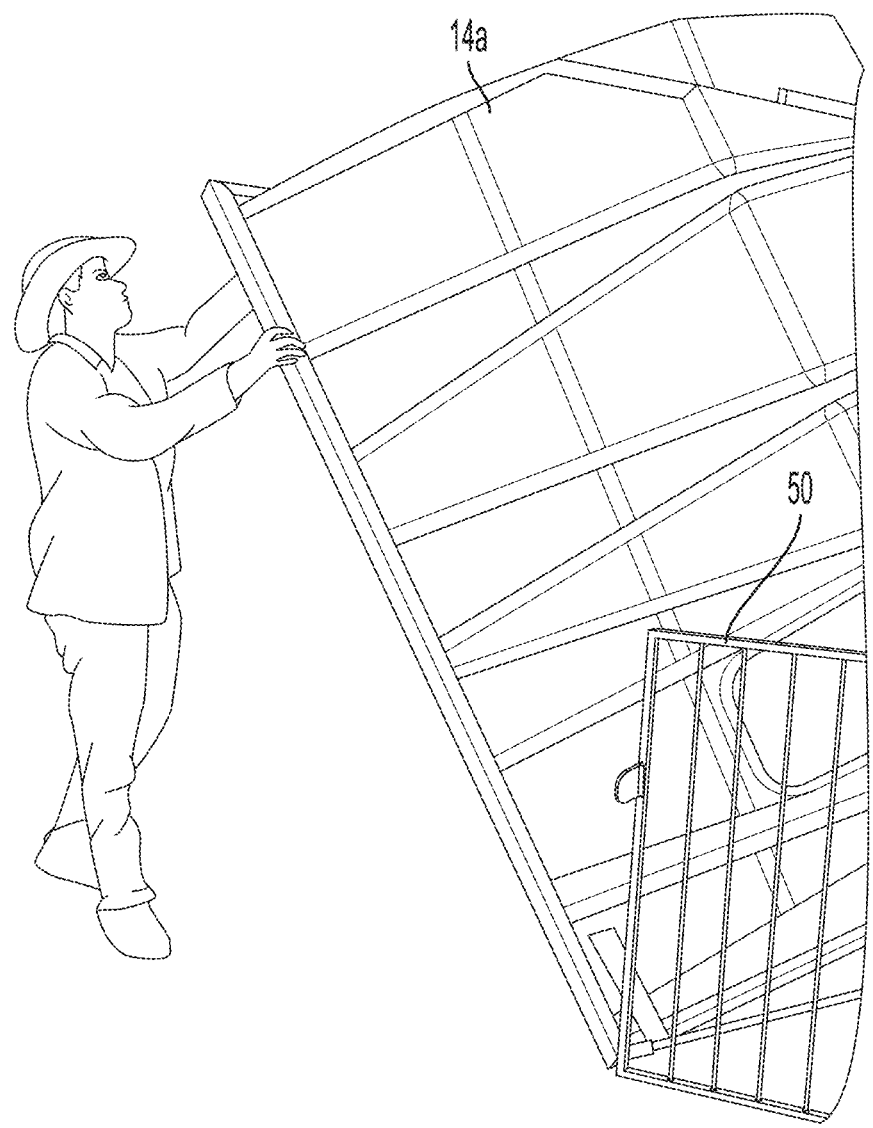
FIG. 18 illustrates the housing system converting between the transport configuration and the operational configuration.
Figure 19:
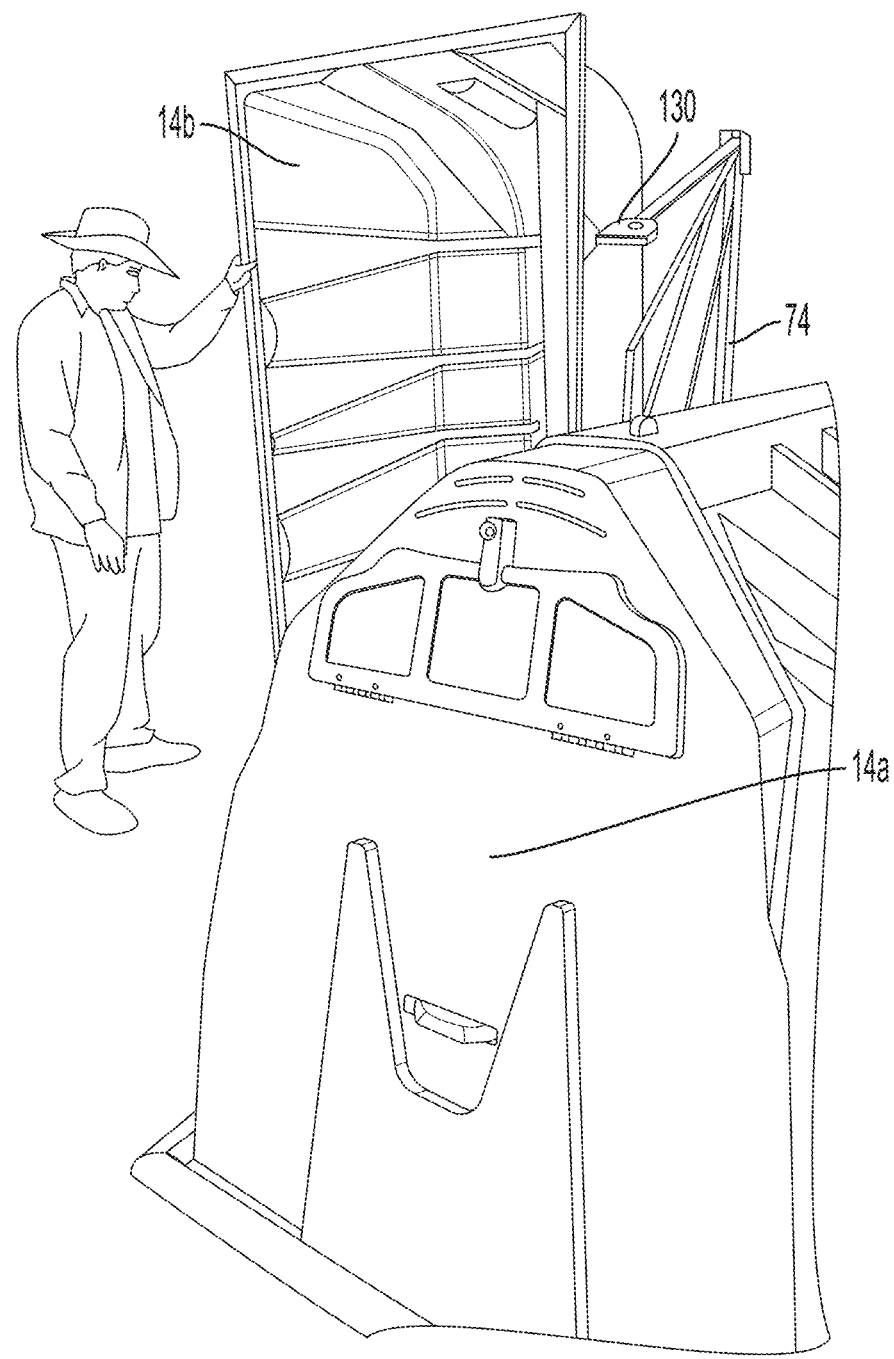
FIG. 19 illustrates the housing system converting between the transport configuration and the operational configuration.

In operation, the housing system 10 may be transported to a desired location and easily converted from the transport configuration to the operational configuration, as shown in FIGS. 16-19. FIG. 16 shows the housing system 10 in the transport configuration as it is being moved by a forklift. Once the housing system 10 is place on a ground surface 126 by the forklift, a user may unlock any locking mechanisms, which may be holding the housing system 10 in the transport configuration. For example, as shown in FIG. 17, the user may disengage the support structure 134 of the divider fence 74 from receiving member of the perimeter fence 50. The user may then rotate each of the housing units 14 to the operational configuration, as shown in FIGS. 18-19. Finally, the user may rotate the divider fence 74 from the transport configuration to the operational configuration, as shown in FIG. 14.

FIGS. 20-24 illustrate a divider fence 174 according to another embodiment. The divider fence 174 includes a top edge 182, a bottom edge 186, a front edge 190, and a rear edge 194, which defined the perimeter of the divider fence 174. The front edge 190 and the rear edge 194 each extend between the top edge 182 and the bottom edge 186 and define a height of the divider fence 174. The top edge 182 and the bottom edge 186 each extend between the front edge 190 and the rear edge 194 and define a length of the divider fence 174. In some embodiments, the length of the divider fence 174 is less than a length of the housing unit 14. The divider fence 174 includes a face 198 extending between the top edge 182, the bottom edge 186, the front edge 190 and the rear edge 194. The face 198 defines a plane that is able to separate the yard 18 into the first portion 178a and the second portion 178b.

Figure 20:
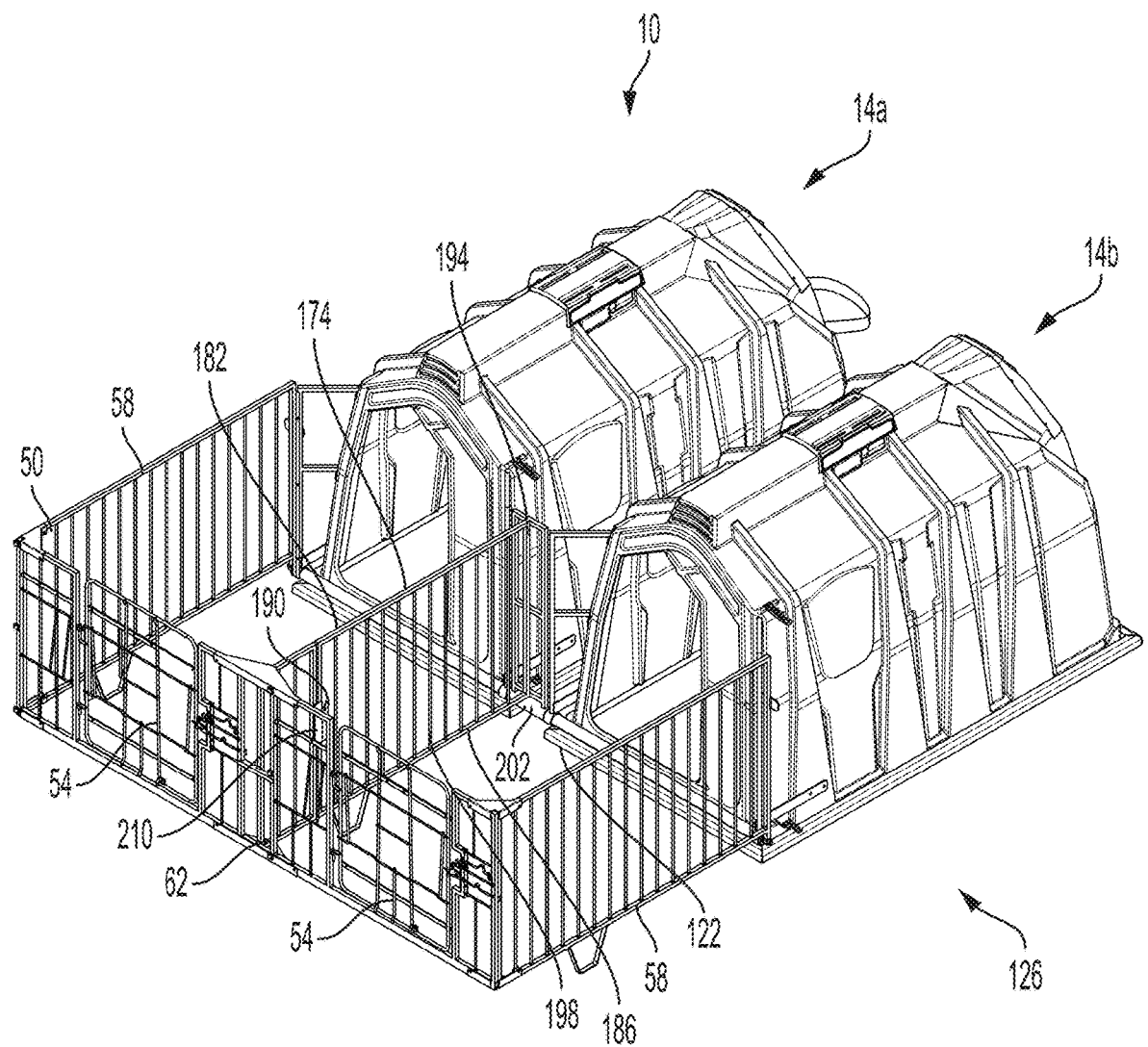
FIG. 20 is a perspective view of a housing system including a divider fence according to another embodiment with a divider fence in a first position.
Figure 21:
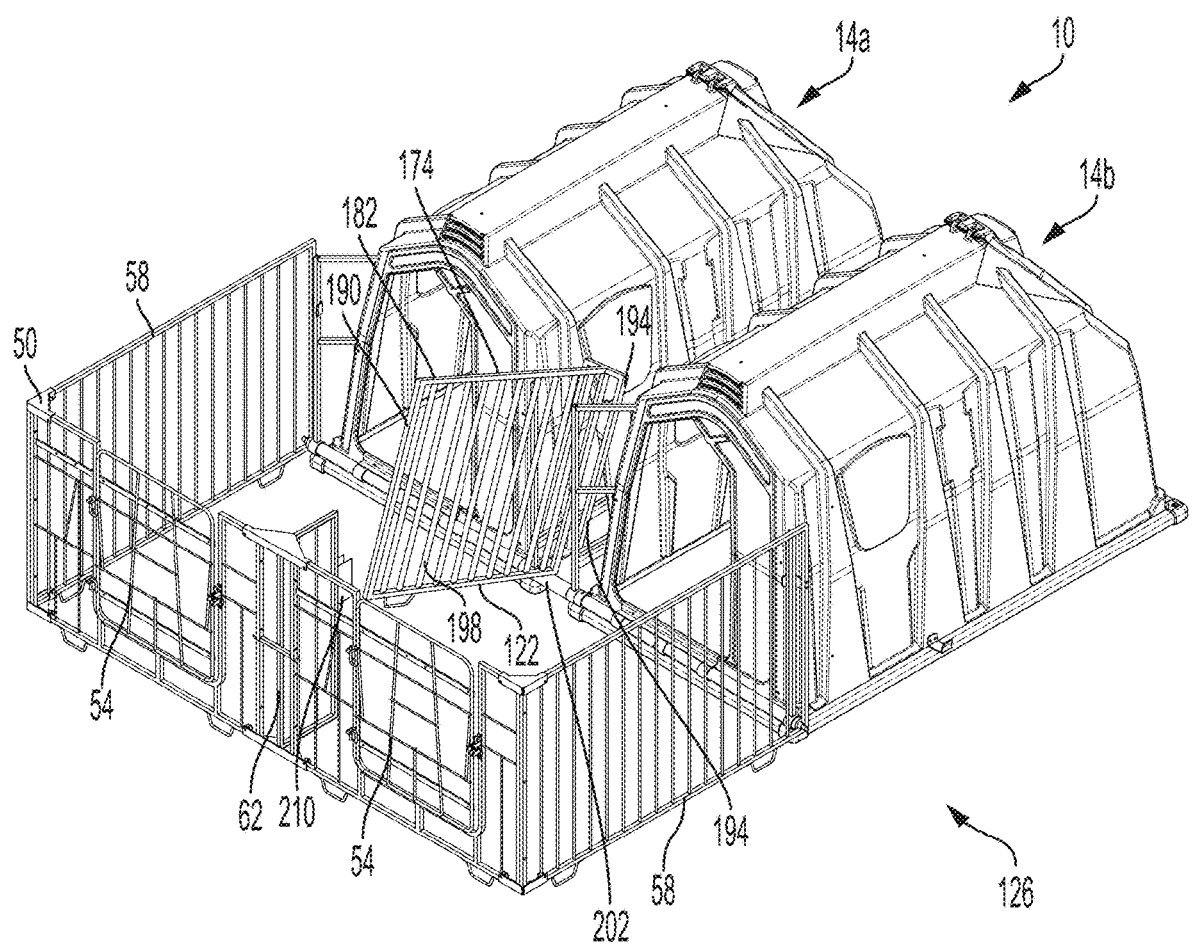
FIG. 21 is a perspective view of the housing system of FIG. 20 with the divider fence in a second position.
Figure 22:
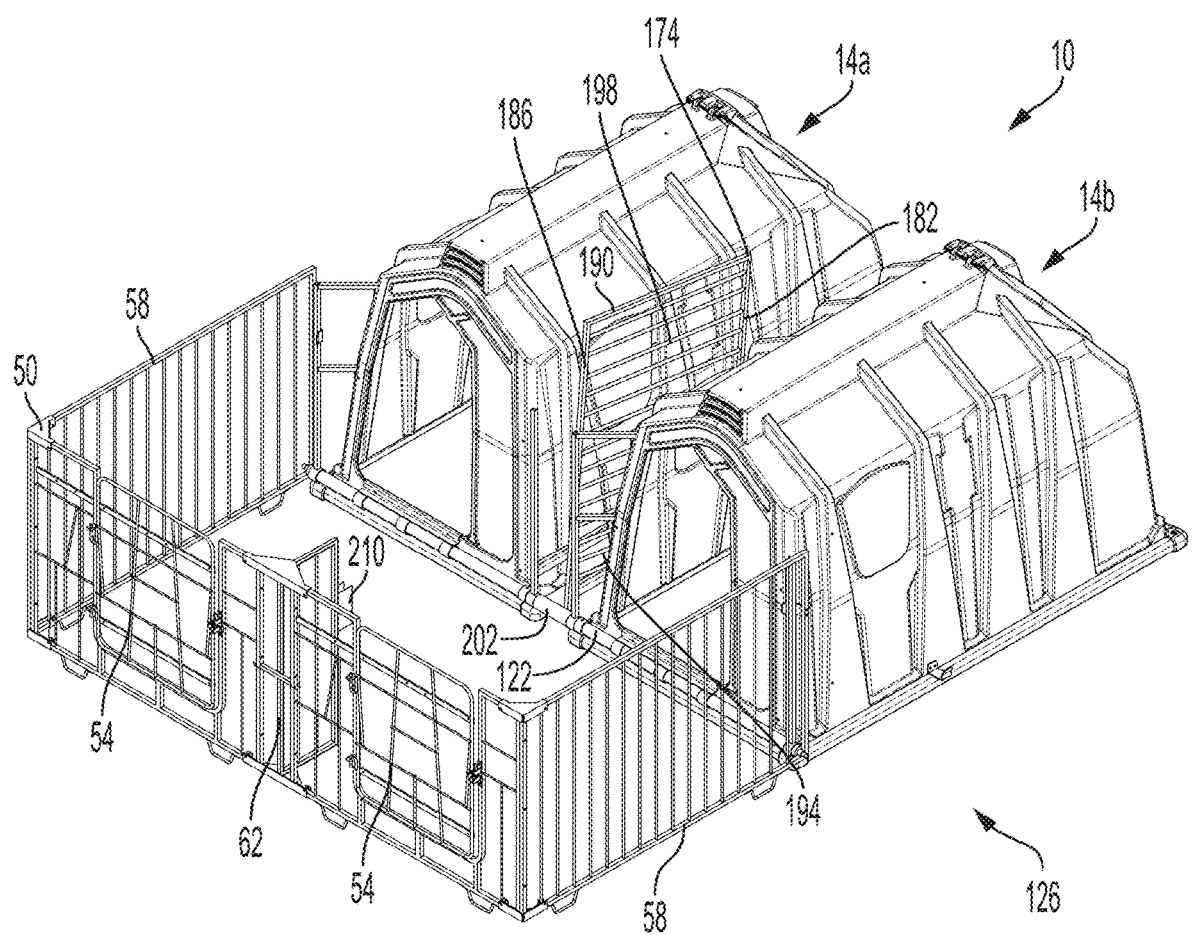
FIG. 22 is a perspective view of the housing system of FIG. 20 with the divider fence in a second position.

The divider fence 174 is movable between a stowed position (FIG. 22) and a deployed position (FIG. 20). In the embodiment shown in FIGS. 20-24, the divider fence 174 rotates about the axle 122 to move between the stowed position and the deployed position. The divider fence 174 may be rotatably coupled to the same axle 122 that the housing units 14 rotate about when converting between the operational configuration and the transport configuration. Specifically, as shown in FIG. 24, the divider fence 174 is rotatably coupled to the axle 122 by a sleeve 202, which extends at least partially around the axle 122 and allows for rotation of the divider fence 174. In other embodiments, the divider fence 174 may be rotatably coupled to the axle 122 by other coupling members. The divider fence 174 is rotatable along the plane defined by the face 198 of the divider fence 174. The divider fence 174 is also adjustable between an operational position and a transport position by rotating about the axle 122. FIGS. 20-23 illustrate the divider fence 174 as it rotates about the axle 22.

In another embodiment, the divider fence 174 does not rotate relative to the axle 122. Rather, the divider fence 174 and the axle 122 may rotate together relative to the housing units 14. For example, in one embodiment, the sleeve 202 is rotatably fixed relative to the axle 122. The sleeve 202 may be fixed to the axle 122 by a bolt or similar coupling member. Alternatively, the divider fence 174 may not include a sleeve, but may be fixed directly to the axle 122.

Figure 23:
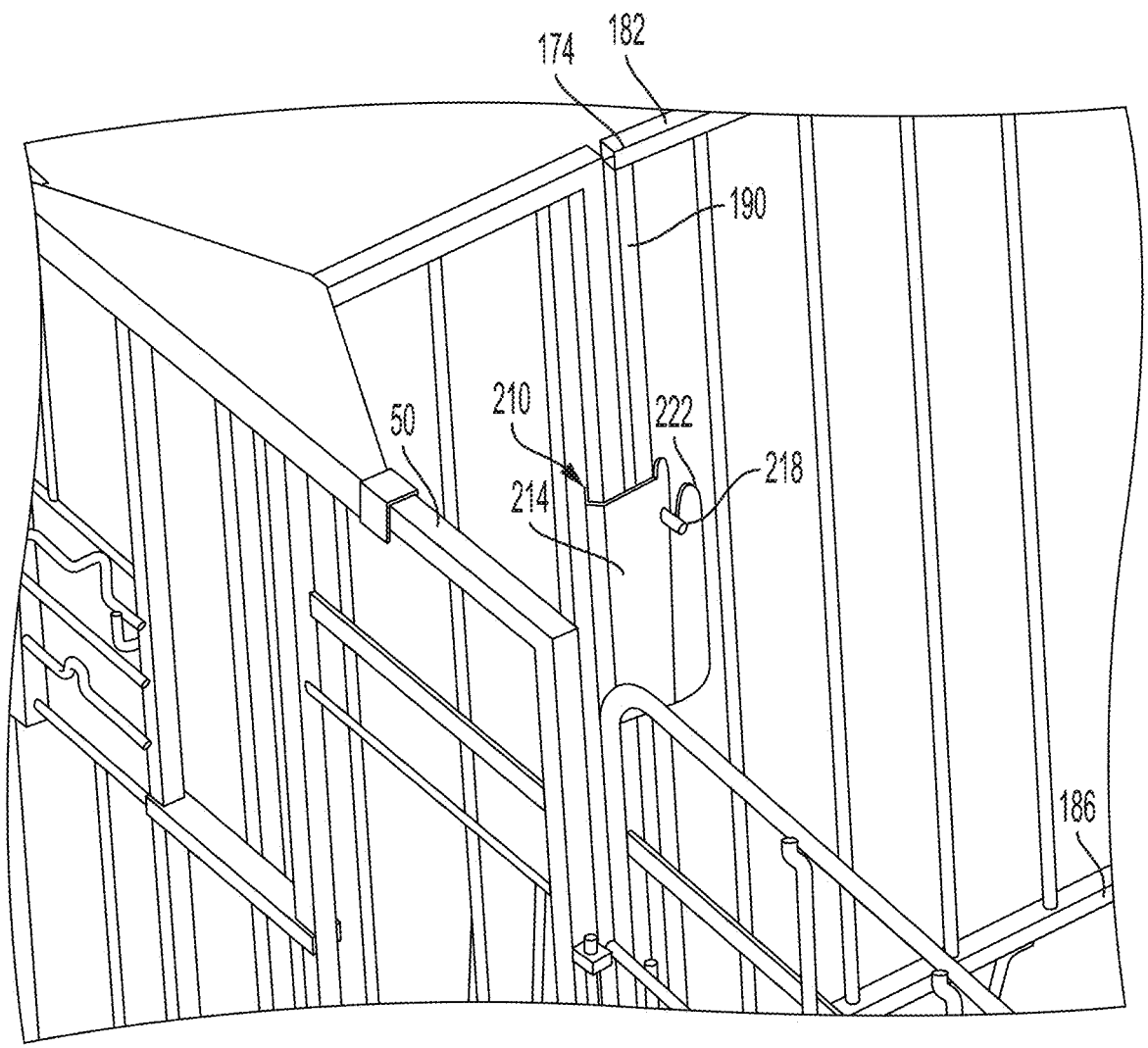
FIG. 23 is a detailed view of a latch for a divider fence according to one embodiment.
Figure 24:
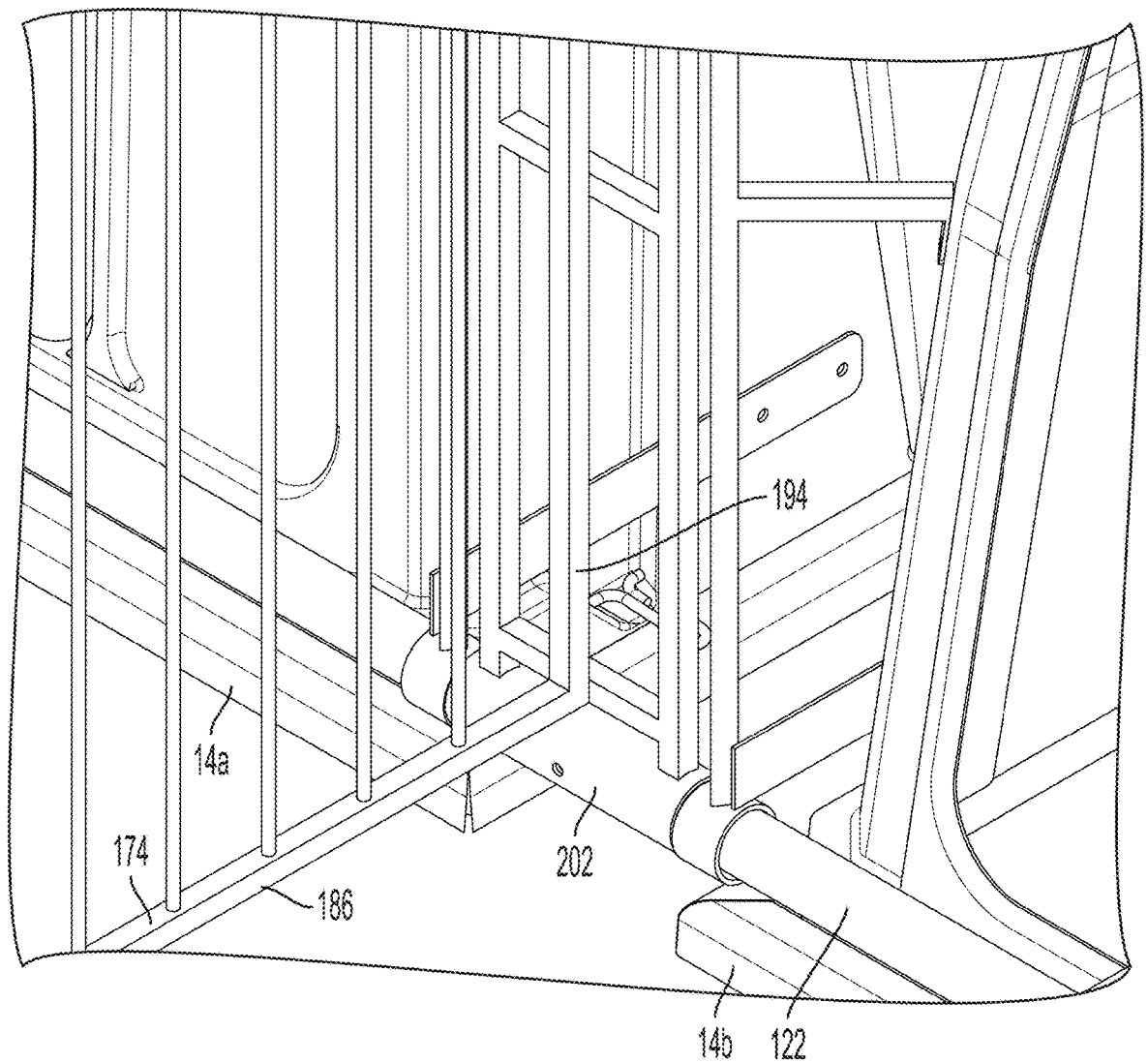
FIG. 24 is a detailed view of a portion of the divider fence.

Referring to FIG. 23, the divider fence 174 is engageable with the receiving portion 106 of the perimeter fence 50. The illustrated housing system 10 includes a latch 210 to allow the divider fence 174 to be selectively coupled to the perimeter fence 50. The latch 210 includes a first latch portion 214 disposed on the receiving portion 106 of the perimeter fence 50 and a second latch portion 218 disposed on the divider fence 174. The first latch portion 214 includes an inlet 222, which is configured to receive the second latch portion 218. In the illustrated embodiment, the inlet 222 is positioned along the top edge of the first latch portion 214 so that the second latch portion 218 can be within the first latch portion 214 as the divider fence 174 is rotated from the stowed position to the deployed position.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:
1. A housing system for calves, the housing system comprising:
   first and second housing units each having
      a first exterior sidewall,
      a second exterior sidewall, a front exterior wall extending between the first exterior sidewall and the second exterior sidewall, a roof extending between the first exterior sidewall and the second exterior sidewall, an opening at least partially defined by the front exterior wall for ingress and egress of a calf into and out of the housing unit, and an enclosed living space extending between and bounded by the first and second exterior sidewalls and the front exterior wall;

wherein the first and second housing units are positioned with respect to each other so that the first exterior sidewall of the first housing unit is positioned adjacent and in facing relationship with respect to the second exterior sidewall of the second housing unit;

a perimeter fence at least partially defining a yard open to the openings of the first and second housing units but closed to the egress of calves from the yard; and a divider fence movable between a stowed position between the first exterior wall of the first housing unit and the second exterior wall of the second housing unit, and a deployed position in which the divider fence separates the yard into first and second portions each open to a respective opening of the first and second housing units, but closed to movement of calves between the first and second portions of the yard.

2. The housing system of claim 1, wherein the divider fence is movable between the stowed position and the deployed position by at least one of a sliding motion and a rotating motion.

3. The housing system of claim 1, wherein the perimeter fence includes a first door positioned to provide access to the first portion of the yard and a second door positioned to provide access to the second portion of the yard when the divider fence is in the deployed position.

4. The housing system of claim 1, wherein the perimeter fence includes a receiving portion engageable with the divider fence when the divider fence is in the deployed position.

5. The housing system of claim 1, wherein the divider fence includes a handle that is accessible to a user from outside the yard such that the user can move the fence between the stowed position and the deployed position without entering the yard.

6. The housing system of claim 5, wherein the handle is movable between a plurality of different positions including at least two selected from the list consisting of: a first position wherein the handle is operable to move the divider fence between the stowed position and the deployed position, a second position wherein the handle is configured to lock the divider fence in the deployed position, a third position wherein the handle is tucked within the bounds of the divider fence.

7. The housing system of claim 1, wherein the divider fence is movable between an operational configuration in which the divider fence is operable to move between the deployed position and the stowed position and a transport configuration in which the divider fence is inoperable to move between the deployed position and the stowed position.

8. The housing system of claim 7, wherein the divider fence is slidable between the deployed position and the stowed position, and wherein the divider fence is rotatable between the operational configuration and the transport configuration, the divider fence rotatable about an axle extending in a direction perpendicular to a plane defined by the divider fence.

9. The housing system of claim 7, wherein the perimeter fence includes a receiving portion engageable with the divider fence when the divider fence is in the deployed position, and wherein the receiving portion is engageable with the divider fence when the divider fence is in a transport configuration.

10. The housing system of claim 1, wherein the first housing unit is rotatable about an axle extending in a direction perpendicular to a plane defined by the divider fence.

11. The housing system of claim 1, wherein the perimeter fence includes a door to selectively provide access to the yard.

* * * * *